United States Patent
Koschmieder et al.

(10) Patent No.: US 6,502,682 B2
(45) Date of Patent: Jan. 7, 2003

(54) HYDRAULIC RELEASE SYSTEM

(75) Inventors: Hartmut Koschmieder, Erlangen; Walter Parzefall, Bubenreuth; Ludwig Winkelmann, Erlangen; Harald Peschke, Veitsbronn, all of (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 9 days.

(21) Appl. No.: 09/906,279

(22) Filed: Jul. 16, 2001

(65) Prior Publication Data

US 2001/0047918 A1 Dec. 6, 2001

Related U.S. Application Data

(62) Division of application No. 09/415,724, filed on Oct. 12, 1999, now Pat. No. 6,273,231.

(30) Foreign Application Priority Data

| Oct. 15, 1998 | (DE) | 198 47 530 |
| Nov. 30, 1998 | (DE) | 198 55 150 |
| Dec. 22, 1998 | (DE) | 198 59 317 |

(51) Int. Cl.$^7$ ............................................. F16D 25/08
(52) U.S. Cl. ................. 192/85 CA; 192/91 A; 192/98; 92/165 R; 277/551; 277/577
(58) Field of Search ................ 192/85 CA, 91 A, 192/98; 92/107, 165 R; 277/436, 437, 551, 560, 572, 577, 945

(56) References Cited

U.S. PATENT DOCUMENTS

| 4,821,627 A | * | 4/1989 | Leigh-Monstevens | 92/107 |
| 5,113,991 A | * | 5/1992 | Kajitani et al. | 192/98 |
| 5,287,951 A | * | 2/1994 | Voit et al. | 192/85 CA |
| 6,076,645 A | * | 6/2000 | Winkelmann et al. | 192/85 CA |
| 6,328,148 B2 | * | 12/2001 | Winkelmann et al. | 192/85 CA |

FOREIGN PATENT DOCUMENTS

| DE | 197 24 988 A1 | * | 12/1998 | |
| EP | 0 071 587 A1 | * | 2/1983 | 427/301 |
| WO | WO 97/33097 A1 | * | 9/1997 | |

* cited by examiner

Primary Examiner—Richard M. Lorence

(57) ABSTRACT

The abstract relates to a hydraulic clutch release system, particularly for motor vehicles. The system 1 has a master cylinder and a slave cylinder, and the slave cylinder has a piston 7 which is annular in form and works inside an annular cylinder 2. The leading end of the cylinder is fitted with a seal 9 which is mounted on a one-piece seal carrier 10a through an undercut part of the carrier in which the seal fits without leaving any empty space.

27 Claims, 14 Drawing Sheets

HYDRAULIC RELEASE SYSTEM

This is a division, of application Ser. No. 09/415,724, filed Oct. 12, 1999, now U.S. Pat. No. 6,273,231 which is hereby incorporated herein by reference, in its entirety.

The present invention relates generally to the hydraulic operation of vehicle friction clutches, and more specifically to a hydraulic piston/cylinder unit for use in a clutch operating system.

Clutch release systems having a slave cylinder as the central release member are known. They comprise a slave cylinder concentrically enclosing a drive shaft and formed as a piston cylinder unit. The cylinder can be detachably fixed on a gearbox housing. The piston can be a ring piston which is displaceable in a circular ring shaped pressure chamber of the cylinder, and the piston can be associated on the pressure chamber side with a seal which is fastened by a seal carrier on the ring piston and is held in positive engagement in the seal carrier.

The invention also relates to a hydraulic piston/cylinder unit, which may be a slave cylinder for a hydraulic release system of a motor vehicle friction clutch (or may be a piston/cylinder unit for some other application). The cylinder pressure housing can have a circular ring shaped pressure chamber with a ring piston displaceably guided in the chamber and an elastic seal fixed with keyed engagement on the ring piston by means of a seal carrier.

The invention further relates to a hydraulic work cylinder which is preferably formed as a component part of a release system for a shift and separate clutch and may be mounted in a vehicle between an internal combustion engine and a manual shift transmission. The release system can comprise a master cylinder unit operated by means of a pedal or an automatic release unit and a pressure transfer mechanism to a further cylinder, which is also to be called a slave cylinder, which concentrically surrounds a drive shaft which connects the internal combustion engine to the transmission. The cylinder forms a pressure chamber which seen in cross-section is circular ring shaped and in which a ring piston is guided axially displaceable between a bore wall of the cylinder and a guide sleeve concentric therewith. On the pressure chamber side the ring piston is associated with a seal.

A release system with the construction explained above is known from DE 196 09 472 A1. The known release system is fitted with a seal carrier which is made without stock removal from steel. This support has on its radially outer projection spaced from the free end a locking nose which in the installation position engages with keyed engagement into a ring groove or local recess of the piston. The locking nose which is shaped semi-circular allows an automatic snap-fit engagement which can become loose by itself e.g. in the event of unfavourable manufacturing tolerances or ill-matched pairings. A seal carrier separated from the ring piston leads to a breakdown or function failure of the slave cylinder. The internal profiled section of the seal carrier which serves to house and fasten the seal has according to the known release system a relatively large axial extension which has a direct detrimental effect on the guide length of the ring piston.

From the French Patent Application FR 2 730 532 on this subject a slave cylinder is known, more particularly for a hydraulic release system of a friction clutch of motor vehicles wherein for the positive locking connection of the seal on the ring piston a retaining plate is provided which is hooked by its ring-shaped part on the outer circumference of the ring piston by means of claws engaging in corresponding recesses and is anchored at the end side in the seal by a radially inwardly directed area. Through this type of fastening a secure hold of the seal on the retaining plate is not guaranteed since the remaining cross-sectional area of the sealing material is now only small and can easily wear away. Furthermore the radial area of the retaining plate engages only from the outside on the seal so that it is easy for the seal to cant.

From DE 34 39 652 A1 a slave cylinder is known for a hydraulic release system of a friction clutch of motor vehicles wherein a stripper element is provided between the ring piston and seal and engages from inside and outside round the seal in dovetailed fashion and thus produces a fixed connection with the seal whereby the stripper element only adjoins the ring piston loose and the problem thereby exists that the contact between the ring piston and stripper element can be lost which leads to function failures of the slave cylinder. Play between the support faces of the seal and the sealing ring support reduces the stiffness and thus degree of efficiency of the operating system associated therewith.

Furthermore from EP 0 168 932 A1 a hydraulic release device is known having a further release shoulder. In order to obtain a surface which favours the wear behaviour of the sealing lips of the ring piston seal the guide faces on the bore wall of the cylinder and on the guide sleeve are subjected to a special mechanical finishing treatment. By way of example the guide faces, i.e. the seal tracks can be enhanced by grinding and/or polishing or honing. These processes extend the manufacturing cycles of the cylinder and are thus disadvantageous from the cost point of view.

For a specific surface treatment of the seal tracks it is generally known to subject these to a sand-blasting treatment in order to improve the wear and/or sliding properties of the seal. By way of example the seal track can be enhanced in an aluminium cylinder by sand-blasting with glass balls. However such a process is very expensive and incurs high costs.

Coating a sealing element can be concluded from DE 40 35 657 A1. To this end in order to influence the sliding ability a foundation body of elastomer can be coated with a material substance. By way of example polyvinyl chloride is used for the coating which is applied onto the foundation body but does not however project into the marginal zone of the foundation body. Such a process is very expensive and demands high production quality. Manufacturing the foundation body and applying the coating must thereby be carried out so that a definite wall thickness of the sealing lips is set in order to obtain for example the elasticity required for the sealing action.

The object of the present invention is therefore to provide a seal carrier which:
  ensures an effective permanent fixing on the ring piston;
  allows improved support of the seal;
  reduces the axial structural length.

The object of the invention is to avoid the faults of the known solutions and to provide a slave cylinder whose sealing assembly ensures precision guidance of the seal in the pressure chamber and furthermore guarantees a permanent fixed connection of the seal relative to the ring piston. Furthermore the seal carrier is to be capable of reliable mass production and able to meet the demands regarding strength whilst taking up minimal axial structural space.

Starting from the technical faults of known solutions it is furthermore the object of the invention to provide a seal for a hydraulic release device
  which is optimised with regard to wear
  whose service life is improved whose friction is reduced and
which cuts down on noise.

Furthermore the release device is to be capable of economic production.

In a hydraulically operable release system of the kind in which a seal is secured on a ring piston by a circular, ring-shaped seal carrier, the object of the invention is achieved by providing the seal with an undercut section that fits snugly into the seal carrier without forming any gaps.

An advantageous embodiment has a seal carrier with different wall thicknesses. Starting from the greatest wall thickness in the area of the outer axial projection according to the invention the wall thickness is provided with a reduced thickness in other sections of the seal carrier, more particularly in partial areas of the internal profiled section or opening directed towards the seal. The proposed difference in wall thicknesses takes into account the manufacturing process, i.e., the deep-drawing process which is preferably used allows the seal carrier to be designed with the optimum profile determined for example by FE-calculation (finite elements). At the same time the seal carrier according to the invention allows optimum axial structural length and shaping which ensures a cost-effective production.

The invention furthermore includes an enlarged end face of the seal carrier on the seal side. To this end the rounded transition between the end face and the inner or outer axial projection of the seal carrier is designed so that the sections of the end faces or the axial projections intersect as a secant the curve formed by the radii at the transitions. This geometric design of the seal carrier enlarges the support face for the seal which has an advantageous effect on the service life of the sealing ring. According to the invention in each rounded transition zone between the end face and the axial projection of the seal carrier it is proposed that starting from the end face an at first smaller radius is adjoined by a larger radius. This measurement increases each time the end face and allows a more heavily rounded end-side transition to the sleeve face of the axially aligned projections of the seal carrier. A seal carrier formed in this way avoids or reduces a gap extrusion of the sealing material between the seal carrier and seal track. At the same time the shear tension in the seal is reduced in the area of the support on the end sides of the seal carrier.

A flanged section provided at the free end of the outer axial projection serves to fasten the seal carrier. In the installation position of the seal carrier the flanged section is angled inwards to produce a radial overlap with a sleeve structure of the ring piston. The flanging can thereby provided round the entire circumference or partially.

A definite overlap in the area of the undercut sections is provided for the internal profiled section of the seal carrier according to the invention provided for fastening the seal. A measurement $H \geqq 0.1 S_1$ is provided for the at least one-sided radial overlap. This overlap makes it possible when installing the seal for the sealing material to fill out the internal profiled section of the seal carrier at least substantially and thus for the seal to receive a permanent hold.

One advantageous development of the invention provides a ring piston which is provided on the pressure chamber side with a shoulder protruding axially from the end side. This shoulder on the inside advantageously increases the guide length of the ring piston on the guide sleeve. The shoulder is thereby formed so that this contacts the seal carrier neither radially nor axially.

To achieve the optimum axial structural length of the seal carrier according to the invention a spacing measurement $L_1$ is determined between the end side and the planar surface of the seal carrier which corresponds to >3.5 times the value of the wall thickness $S_1$. Seal carriers with small spacing measurements defined in this way allow a desired extended axial guide length of the ring piston which has an advantageous effect on the function of the slave cylinder.

An advantageous development of the invention proposes designing the seal carrier so that a doubled or folded area adjoins the lead-in zones of the opening. As a spacing measurement for a seal carrier designed in this way a measurement is provided between the end side and the planar surface of the seal carrier which corresponds maximum to 3.5 times the value of the wall thickness $S_1$. A seal carrier with a doubled area previously explained consequently allows the axial structural length of the seal carrier to be further reduced.

For the wall thickness $S_1$ of the seal carrier in the outer axial projection a measurement of greater than 0.2 mm has proved practical and expedient. A seal carrier with this wall thickness allows a cost-effective production which can be made without stock removal and nevertheless has sufficient strength.

The configuration of the seal carrier according to the invention furthermore includes an internal profiled section mounted centrally in the circular ring shaped end face of the seal carrier. This internal profiling ensures in the case of a seal biased with pressure that the axial force introduced from the seal onto the seal carrier is transferred in a straight line to the ring piston. For groove ring seals used having asymmetrically arranged sealing lips the invention likewise includes a seal carrier whose axis of symmetry ($S_a$) from the internal profile for holding the seal is arranged coinciding with or off-set from the end-side centre (M) of the seal carrier.

In the rounded transition zone between the end face and at least one axial projection of the seal carrier it is proposed according to the invention that starting from the end face an at first smaller radius is adjoined by a larger radius. This measurement enlarges each time the end face and allows a more heavily rounded end-side transition to the sleeve face of the axially aligned projections of the seal carrier whereby a desired smaller edge radius is set which reduces a gap extrusion of the sealing material.

A further advantageous design of the invention provides a seal carrier having a symmetrically shaped internal profile which has two undercut sections. Deviating from this the invention likewise includes sealing supports with only one undercut section which can be aligned in the direction of the outer projection or towards the inner projection. The invention further includes undercut sections of different geometric shape in an internal profile which can be determined for example in dependence on the material pairing of the seal carrier and/or seal or on other parameters.

The seal carrier according to the invention having multi-curved shaping is provided in the individual transitions with differently shaped radii. Fixing the radii in this way serves on the one hand to enlarge the end-side support surface of the seal on the seal carrier and to facilitate the elastic deformation of the sealing substance for fitting into the opening or internal profiled section of the seal carrier and on the other to simplify the manufacture of the seal carrier. In the area of the lead-in zone of the seal carrier the radii thereby exceed the measurement of the wall thickness $S_1$. The inner radii in the internal profiled section or mounting of the seal carrier are $\leqq$ the radii at the lead-in zone.

The idea of the invention furthermore includes an overall length of the outer axial projection which is greater than the distance measurement between the end side and the planar surface of the seal carrier. The axial projection can thereby be adapted to the relevant conditions or requirements relating to the shape of the ring piston and the type of fastening.

The idea of the invention provides a ventilation groove in the seal carrier for the purpose of improving the seal assembly. The air included in the internal profiled section can escape through the seal groove when mounting the seal and thus the internal profiled section can be completely filled out with sealant material. A ventilation groove is thereby preferably provided which is formed axially parallel to the outer projection in a protrusion of the seal carrier. Alternatively the seal carrier can be provided for ventilation with a bore which is preferably formed in the planar surface.

A further development of the seal carrier provides that the inner projection is guided up to the end face of the ring piston whilst maintaining an annular gap. For ring pistons which are provided on the end side with an axially protruding shoulder by which the guide length of the ring piston on the guide sleeve can be increased, the inner projection of the seal carrier is correspondingly shortened so that an annular gap is likewise set between the shoulder of the ring piston and the projection. For further optimising the guide length of the ring piston its axially protruding shoulder can be guided up to the radially aligned section of the seal carrier. The inner projection of the seal carrier is thereby omitted. To avoid contact or support of the seal carrier on the shoulder of the ring piston an axially and radially setting annular gap is provided between these component parts.

For the inner projection of the seal carrier the invention proposes that this runs conical at least in part. Starting from the end side of the seal carrier towards the free end, the inner projection is directed radially outwards. This design prevents detrimental contact of the guide sleeve by the free end of the projection. The design of the inner projection according to the invention further proposes that in the installed state the projection is guided up to the end side of the ring piston whilst maintaining an annular gap. The annular gap for which a measurement of $\geq 0.1 S_1$ is preferably provided creates a controlled seal carrier which is supported on the ring piston solely through the planar surface.

According to the invention a metal material capable of being deep drawn is provided as the material for the seal carrier which is made without stock removal. A steel plate St4 or a comparable material is a suitable example.

The object of the invention is further achieved in that the seal carrier has a circular ring shaped mounting chamber opening towards the seal and provided with an inner ring and outer sleeve, that the inner space in the end area of the mounting chamber facing the seal is reduced, that the seal has at least a correspondingly shaped recess, ring groove or the like for keyed connection with the seal carrier and that the seal carrier is constructed of two component parts which can be made separately from each other. It is thereby ensured on the one hand that the seal is fixedly anchored in the seal carrier and is enclosed by the inner ring and/or outer sleeve of the circular ring shaped mounting chamber wherein the seal is not weakened in cross-section to the extent that it can rip or tear. The invention reduces the axial and radial play between the sealing ring and sealing ring support and at the same time improves the stiffness and degree of efficiency of the overall system. In that the seal carrier consists of two parts these individual parts can on the other hand be easily manufactured so that overall a cost-effective seal carrier is produced.

The reduction in the internal spacing in the end area can be formed both by a restriction on the outer sleeve and a widening of the diameter on the inner ring whereby both measures can also exist. In order to avoid sharp edge transitions in the case of the restriction or diameter expansion these are provided in the form of ring beads. Corresponding deformations on the seal also produce suitably rounded transitions there.

The two-part construction of the ring support is preferably designed so that the outer sleeve is formed circular ring shaped and that inside same is the inner ring which is adjoined on the side remote from the seal by a disc-like flange which is in active connection with the outer sleeve.

This active connection can be made on the one hand so that the disc like flange is fixed in a fixing groove on the inner circumference of the outer sleeve. This is particularly advantageous when the outer sleeve and inner ring are made of a material having sufficient elastic deformability whereby then the disc-like flange is pressed into the outer sleeve and snap-fits in the fixing groove. Various materials can be used such as for example steel, aluminium, sintered parts or plastics parts whereby the latter can also be strengthened by steel reinforcements.

The disc-like flange can also have on its outer circumference projections which project into windows or recesses on the outer sleeve. Also with this design the disc-like flange can be pressed into the outer sleeve whereby the projections snap-fit in the windows or recesses on the outer sleeve.

In a further development of the invention the disc-like flange can also be fixed in one direction on one or more stops on the inside face of the outer sleeve and can be fixed on the opposite side by material embossing or welding. The disc-like flange can thereby also be stuck to the outer sleeve. With plastics parts fixing the disc-like flange can be achieved by ultrasound welding whereby in the case of metal parts laser welding or soldering in a continuous furnace can also be used. Both the outer sleeve and the inner ring can if they are made of aluminium or steel also be formed as flow pressed parts. The or each stop can be produced by rolling or embossing, particularly if the outer sleeve is made of steel, whereby the disc like flange can also be connected non-detachable to the stops directly e.g. through spot welding or through resistance welding.

The disc like flange can be fixed on the outer sleeve according to a further design of the invention where after installing same the outer sleeve receives grooves, projections, studs or the like by rolling or imprinting each side of the disc like flange.

Also the disc like flange can be fixed by one or more stops, by projections, studs and the like on the inner circumference of the outer sleeve on one side and by the end face of the ring piston on the other since the outer sleeve clamps the disc-like flange along with same through its keyed fastening on the ring piston.

The disc like flange can finally be provided on its outer circumference with a thread and can be screwed onto a counter thread on the inner circumference of the outer sleeve.

The outer sleeve in turn has at its end area remote from the seal inwardly directed projections, studs or the like which can hook with keyed engagement into corresponding recesses, undercut sections or a ring-shaped restriction on the ring piston.

A further alternative fastening of the inner ring on the outer sleeve is provided in that the disc like flange has on its outer circumference a substantially cylindrical extension which extends in the direction remote from the seal and corresponds with the inner circumference of the outer sleeve whereby the cylindrical extension is fixed on the inner circumference of the outer sleeve by adhesive, welding or press-fit. The cylindrical extension can also have windows or openings which correspond with the inwardly directed projections on the outer sleeve so that these undertake both the fixing of the cylindrical extension whilst ensuring the fastening on the outer circumference of the ring piston.

The problem previously mentioned is further solved according to the invention by a seal which is subjected at least in part to chemical finishing. Particularly suitable for this are halogens though which a marginal zone of the sealing substance can be chemically changed. Halogens are characterised by a large reaction capacity which can be transferred to materials from which seals are made.

Advantageously by a chemical halogen treatment of the seal it is possible to achieve a purposeful hardening or brittleness of a marginal zone of the seal. The chemical treatment which is also termed halogenization signifies the introduction of halogen into an organic compound for example into a benzene ring. The bearing proportion of the sealing lips can be directly influenced by the changed material properties for example. By including the special material properties of the relevant sealing material used each time and taking into account the different reactions it is possible to change or influence by different parameters the depth of penetration of the marginal zone of the seal. As a result of the chemical treatment according to the invention which influences the bearing proportion of the sealing lips, on the one hand the sealing quality of the seal is improved and on the other the sealing lip becomes more resistant to wear as a result of the brittle finish or surface hardening. Furthermore the chemical treatment reduces the friction force so that the release force required to operate the shift and separate clutch is clearly reduced independently of the temperature of the release system. Finally the seal according to the invention reduces the noise development as a result of clear friction conditions. As a result of the brittle condition the disadvantageous stick-slip effect which is linked with a corresponding noise development is now avoided. The effect also designated back-slipping leads in short intervals periodically to sticking, breaking loose and further movement of the sealing lip on the sealing track face.

Advantageously through the invention the micro deformation of the sealing material in the area of the sealing lip is reduced whereby the friction can be directly reduced. The chemical finishing treatment in conjunction with the optimized geometry of the seal leads to a solution to the problem on which this invention is based. As a result of the changed shaping a reduced contact length of the seal is set and thus a shortened dynamic cylindrical contact surface of the sealing lips in order to minimize the friction. The optimized sealing geometry according to the invention creates overall a shortened seal which allows an increased stroke of the ring piston or optimisation of the structural space in the axial direction of the cylinder.

As a cost-improving measure the invention proposes restricting the chemical finishing treatment to the sealing lips of the seal. To this end a fluid is preferably used in which halogens are dissolved. Deliberately immersing the seal can consequently result in a local chemical change of the marginal zone. The hardening or brittle nature desired for the sealing lip is thus not transferred to the remaining areas of the seal.

In a further development of the invention it is proposed for the chemical finishing treatment to chlorinate, brominate, iodinate or fluorinate the seal or partial areas of the seal. This finishing treatment can also be carried out in a gaseous or liquid phase and is likewise suitable for the materials normally used for seals, such as e.g. EPDM. Processes normally used in the chemical industry are used for this purpose. With a fluorinated sealing lip an effect is set wherein the sealing lip remains relatively elastic and has a sufficient sealing action from fluids but allows gas to pass through the sealing lip to a limited amount. Chlorination is used in particular to achieve a relative stiffening of the sealing lip but here a reduced sealing friction is set compared with a fluorinated sealing lip.

The chemical finishing treatment changes the marginal zone in that for example chlorine or another halogen diffuses into the sealing substance and thereby influences the marginal zone to a depth of >5 $\mu$m.

For the hydraulic release device different pairings of material are provided between the seal, i.e. the sealing lips thereof and the seal tracks on the bore wall of the cylinder and guide sleeve. Preferably an elastomer such as EPDM, HNBR, NBR, is provided as the sealing material. A metal material, more particularly aluminium is provided as a suitable material for the cylinder. The guide sleeve which is integrated in the cylinder represents however a sheet metal part which is made without stock removal by the deep-drawing process.

A bearing proportion of >15% is provided for the surface quality of the sealing track on the bore wall of the cylinder. The sleeve face of the guide sleeve on which the inner sealing lip of the seal sealingly adjoins has however a bearing proportion of >20%.

The structure of the release system according to the invention furthermore has an asymmetrically shaped seal with sealing lips whose longitudinal extension and wall thickness differ from each other. The inner sealing lip has a greater length extension than the outer sealing lip. On the other hand the wall thickness of the outer sealing lip exceeds the wall thickness of the inner sealing lip.

For an optimum design of the seal a wall thickness ratio of the outer sealing lip to the inner sealing lip of $$\frac{L_6}{L_5} \geq 1.1$$

has proved advantageous. For the longitudinal extension of the sealing lips a length ratio $$\frac{L_1}{L_3} \geq 1.1$$

between the inner sealing lip to outer sealing lip has proved optimum.

The further development of the seal comprises a V-shaped ring groove on the end side restricted radially by the sealing lips. The groove depth is thereby defined by a measurement which extends from the back of the seal to the groove base. According to the invention it is established that this measurement always exceeds a length measurement from the back of the seal to a function point of the inner sealing lip.

The device of the seal according to the invention further includes the shaping of an outer contour of the inner and outer sealing lip. According to this each sealing lip in the non-installed state intersects an active line corresponding to the sealing lip track face in the installation position on the bore wall of the cylinder or on the sleeve face of the guide sleeve. Starting from the back of the seal the outer contour of the two sealing lips defines on the inside an underlap zone B;D extending up to the active line. After the intersection of the sealing lip outer contour with the active line the outer contours of the two sealing lips define on the outside an overlap zone A;C. The overlap zones A;C thereby each extend from the intersection with the active line up to a function point at which each relevant sealing lip adjoins the sealing track with the greatest radial pretension.

The following surface area ratios can be designated optimum for each relevant sealing lip. For the inner sealing lip a ratio of overlap zone A to underlap zone B is $$\frac{A}{B} > 0.5$$

and for the outer sealing lip a corresponding ratio is provided of $$\frac{C}{D} > 0.7.$$

As an alternative to the surface area ratios mentioned above the invention also includes a surface area ratio of $$\frac{A}{B} = 1$$

as well as a matching surface area ratio $$\frac{C}{D} = 1.$$

Furthermore the seal can have matching surface area ratios $$\frac{A}{B} = \frac{C}{D},$$

i.e. the surface areas of the overlap zones and underlap zones have the same size.

The design of the seal further includes a measurement ratio which is set between a vertical measurement—which determines the radial spacing between the active lines of the two sealing lips—and a length measurement between the back of the seal and the free end of the radially inner sealing lip. This measurement ratio $$\frac{L_1 + L_4}{D_1}$$

is to amount to >0.6.

In order to determine the length measurements of the two sealing lips, starting from the back of the seal to the function point, the following length measurements are provided: for the inner sealing lip a length measurement of >2.6 mm is provided, characterised by $L_1$. The corresponding length measurement for the radially outer sealing lip, designated $L_3$, amounts to >2.2 mm.

The two sealing lips each form, starting from the function point, an end section whose outer contour in the non-installed state runs at an angle of ±5°.

The depth of the V-shaped circumferential groove formed at the end side in the seal is determined by a measurement ratio which is related each time to the back of the seal. The measurement $L_1$ between the back of the seal and the function point of the inner sealing lip set in relation to the measurement $L_2$ between the groove base of the ring groove at the end and the back of the seal amounts to >1. This measurement ratio prevents the seal from becoming weakened in the area of the sealing lip root.

According to a further development of the invention each sealing lip is provided on the outer contour in the area of the function point with a radius $R_1$; $R_2$. Thus a rounded transition is set in the area of the function point between the substantially cylindrical end section and the outer contour of the seal running towards the back of the seal.

For the V-shaped ring groove of the seal according to the invention it is proposed that this forms a radius $R_3$ at the groove base. The size of the radius $R_3$ is thereby selected so that this exceeds the radius $R_1$;$R_2$.

The invention further proposes a rounded transition from the outer contour of the relevant sealing lip to the back of the seal. This transition is likewise designed in the form of a radius $R_4$; $R_5$ wherein these radii are larger than the radii $R_1$; $R_2$. The radii $R_4$; $R_5$ can be dimensioned both different from each other or the same size.

For the partial chemical finishing treatment of the seal it is proposed that each relevant sealing lip is biased in the area of the outer contour each time starting from the tangent point of the radius $R_4$; $R_5$ to the back of the seal up to the free end.

The chemical finishing treatment of a sealing substance according to the invention can be used quite generally for seals in vehicle hydraulics. Both seals which are used in a master cylinder and seals for a master cylinder can be subjected to a halogen treatment where necessary.

The invention will now be explained in further detail with reference to the 30 figures in which.

Figure 1:
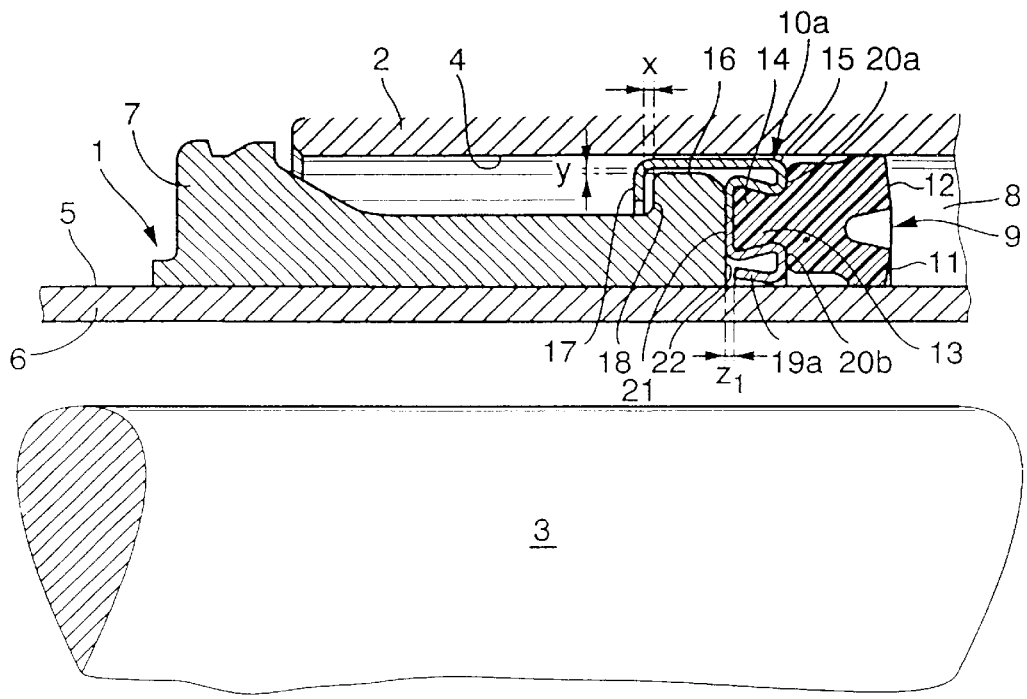
FIG. 1 is a half-sectional view of a ring piston on which a seal carrier according to the invention, including a groove ring seal, is fastened.

FIG. 1 shows some component parts of a hydraulically operable release system 1 in semi-section. The release system 1 comprises a pressure housing 2 which is arranged concentric with a drive shaft 3 which connects an internal combustion engine to a manual shift gearwheel transmission. A guide sleeve 6 arranged radially spaced from both a bore wall 4 of the pressure housing 4 and from a drive shaft 3 forms a sleeve face 5 on which the ring piston 7 is guided. The ring piston 7 is sealed from a pressure chamber 8. A seal 9 serves for this which is fastened with keyed engagement on the ring piston 7 by means of a seal carrier 10a. The seal 9 which is formed as a groove ring seal sealingly adjoins the guide sleeve 6 by its radially inner sealing lip 11. The radially outer sealing lip 12 is however guided sealingly on the bore wall 4. The seal carrier 10a which is formed from sheet metal without stock removal forms on the seal side an end-side opening 13 which is widened out radially in the direction of the ring piston 7 and thereby forms a trapezoidal inner profile 14. In the installation position of the seal 9 the inner profile 14 is filled up with sealant material of the seal 9 in order to produce a positive-locking fastening of the seal 9 on the seal carrier 10a. An outer axially protruding projection 15 which starting from an end side 20a engages concentrically on the outside round an end-side section of the sleeve face 16 of the ring piston 7 serves as fastening for the seal carrier 10a on the ring piston 7. At the free end the projection 15 is provided with a flanged area 17 at the step 18 directed radially inwards at a right angle.

In order to achieve a play-afflicted bearing of the seal carrier 10a against the ring piston 7 the projection 15 is attached to the ring piston 7 with an axial play x as well as with a radial play y. On the side directed towards the guide sleeve 6 the seal carrier 10a forms a further projection 19a which runs conical starting from an end side 20b of the seal carrier 10a so that a free end of the projection 19a does not contact the guide sleeve 6. In FIG. 1 the seal carrier 10a is supported by a planar surface 21 on an end face 22 of the ring piston 7. In this position of the seal carrier 10a an annular gap $z_1$ is formed between the free end of the projection 19a and the end face 22 of the ring piston 7 to prevent the projection 19a from contacting the ring piston. Through this measure it is ensured that in the event of pressure biasing of the seal 9 force is introduced onto the ring piston 7 solely through the planar surface 21 of the seal carrier 10a on the end side 22 of the ring piston 7.

In a second and third embodiment (FIGS. 2 and 3) of a hydraulically operable release system 1 the component parts agreeing with the first embodiment are provided with the same reference numerals so that reference can be made to the description of the first embodiment to avoid repetitions.

Figure 2:
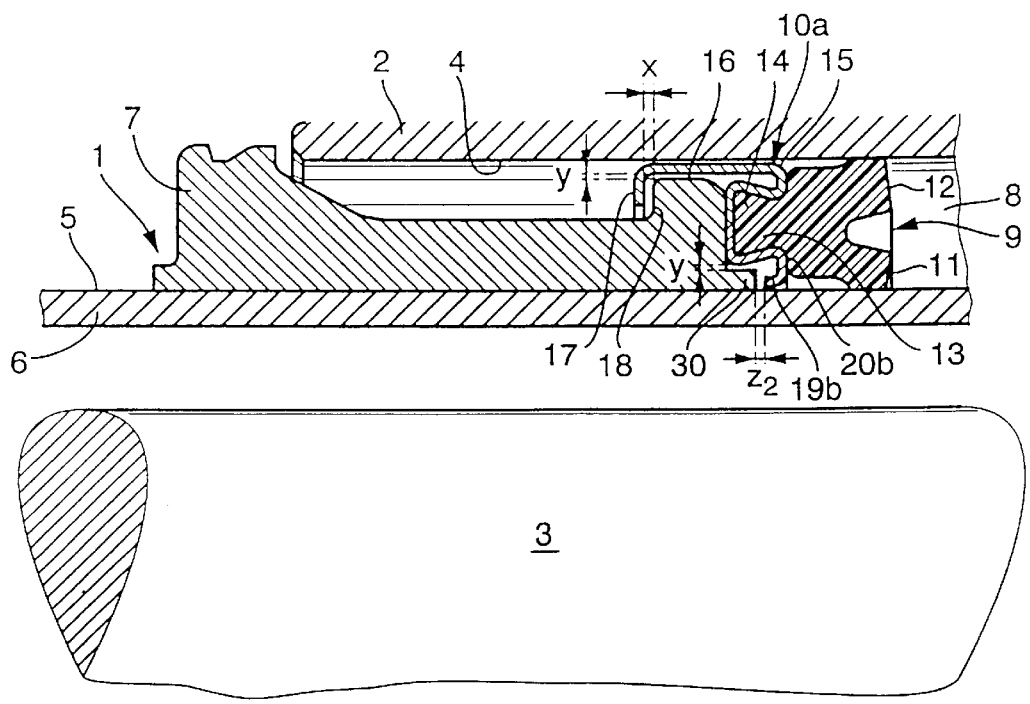
FIG. 2 is a view substantially according to FIG. 1 wherein the ring piston, in order to receive an increased guide length, is provided with a shoulder which interacts with a corresponding inner projection of the seal carrier.

In FIG. 2 the ring piston 7 is provided on the pressure chamber side with a shoulder 30 axially emerging from the end face 22 and with which the guide length of the ring piston 7 on the guide sleeve 6 can be increased. The inner projection 19a is shortened accordingly corresponding to the length of the shoulder 30. In order to avoid the projection 19a contacting or bearing against the shoulder 30 an axial play is provided between these component parts, characterised by $z_2$. The design of the shoulder 30 furthermore provides a radial play relative to the seal carrier 10a which agrees with the radial play Y between the outer projection 15 and the ring piston 7.

Figure 3:
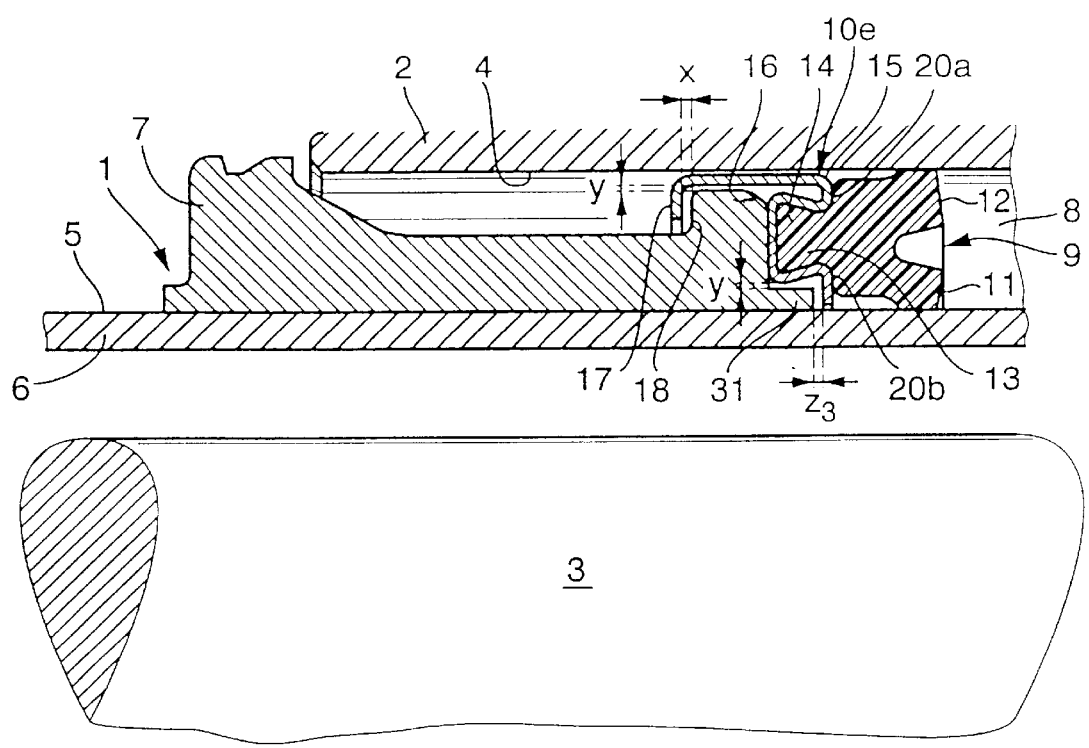
FIG. 3 shows a ring piston further improved with regard to its guide length compared with FIG. 2, with a suitably adapted seal carrier.

FIG. 3 shows the ring piston 7 with a further optimized guide length. To this end the ring piston 7 is provided at the end side with a shoulder 31 which extends whilst maintaining an annular gap $Z_3$ up to the radially aligned area of the seal carrier 10a designated the end side 20b. As already explained with reference to FIG. 2 the shoulder 31 also runs up to the seal carrier 10a whilst maintaining the radial play Y.

Figure 4:
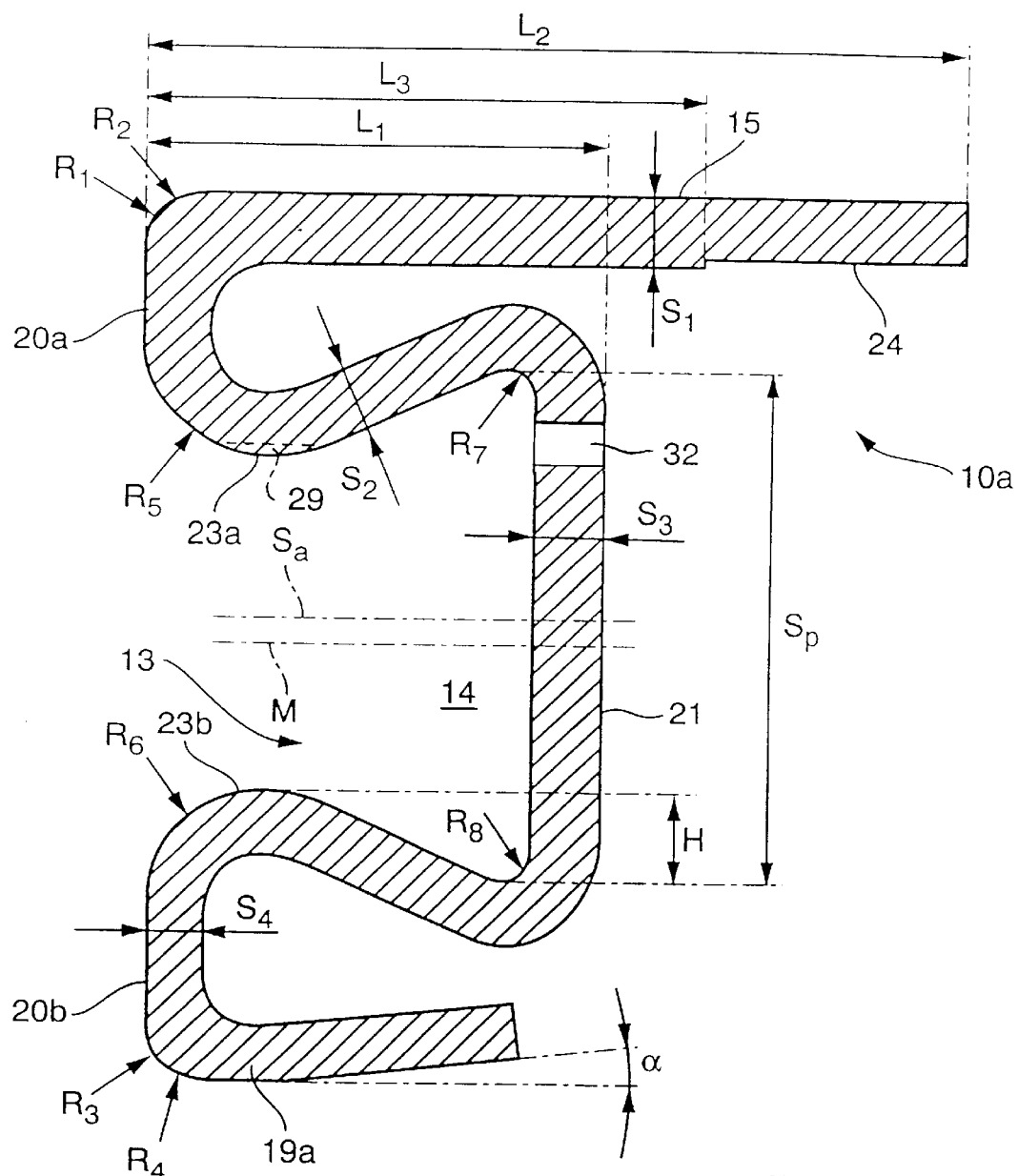
FIG. 4 shows in an individual itemised drawing a longitudinal section through the seal carrier shown in FIG. 1.

FIG. 4 shows the exact construction of the seal carrier 10a according to the invention. By way of example different wall thicknesses are provided for the seal carrier 10a. This means that starting from a wall thickness $S_1$ in the area of the outer axial projection 15, a reduced wall thickness $S_2$ is permissible for example in the area of a lead-in zone 23a and/or a wall thickness $S_3$ is permissible in the area of the planar surface 21 as well as the wall thickness $S_4$ in the area of the end side 20b. In addition to the areas of the seal carrier 10a previously mentioned outside of the projection 15 any other types of sections of the seal carrier with a wall thickness differing from the wall thickness $S_1$ can also be provided, depending on the strength requirements and as a consequence of the manufacturing process used. The shaping of the seal carrier 10a furthermore provides following radii in the area of the rounded transitions. In the transition area from the end side 20a to the sleeve face of the projection 15 the end side 20a is adjoined by a first radius $R_1$, followed by a further larger or similar sized radius $R_2$. For the transition beginning from the end side 20b first a radius $R_3$ is provided which is adjoined by a similar or larger radius $R_4$ in the transition to the projection 19a. For the radii $R_1$, $R_3$ a measurement of <0.8 mm is provided. In the lead-in zones 23a, 23b of the sealing ring support 10a, i.e. beginning from the end side 20a, 20b in the direction of the inner profile 14 a radius $R_5$, $R_6$ is provided with a measurement > the wall thickness $S_1$. In the inner profiled section 14 of the seal carrier 10a at the end of the planar surface 21 a radius $R_7$ and $R_8$ is provided respectively which are designed ≦ the radii $R_5$, $R_6$.

The seal carrier 10a has in the area of the inner profile 14 an overlap H which corresponds to half the measured difference between the opening 13 and an expanded measurement Sp of the inner profile 14. A measurement of >0.1$S_1$ is provided for the undercut section H which is also to be termed the radial overlap. FIG. 4 shows a radial stagger between the axis of symmetry Sa of the inner profiled section 14 and a centre M of the seal carrier 10a. The essential measurement of the seal carrier 10a directly affecting the axial structural length of the ring piston 7 is the spacing measurement $L_1$ which extends from the end side 20a, 20b up to the planar surface 21. The measurement $L_2$ determines the length of the outer projection 15. The measurement $L_3$ determines the longitudinal extension of the projection 15, reduced by the measurement for a flanged step 24.

Figure 5:
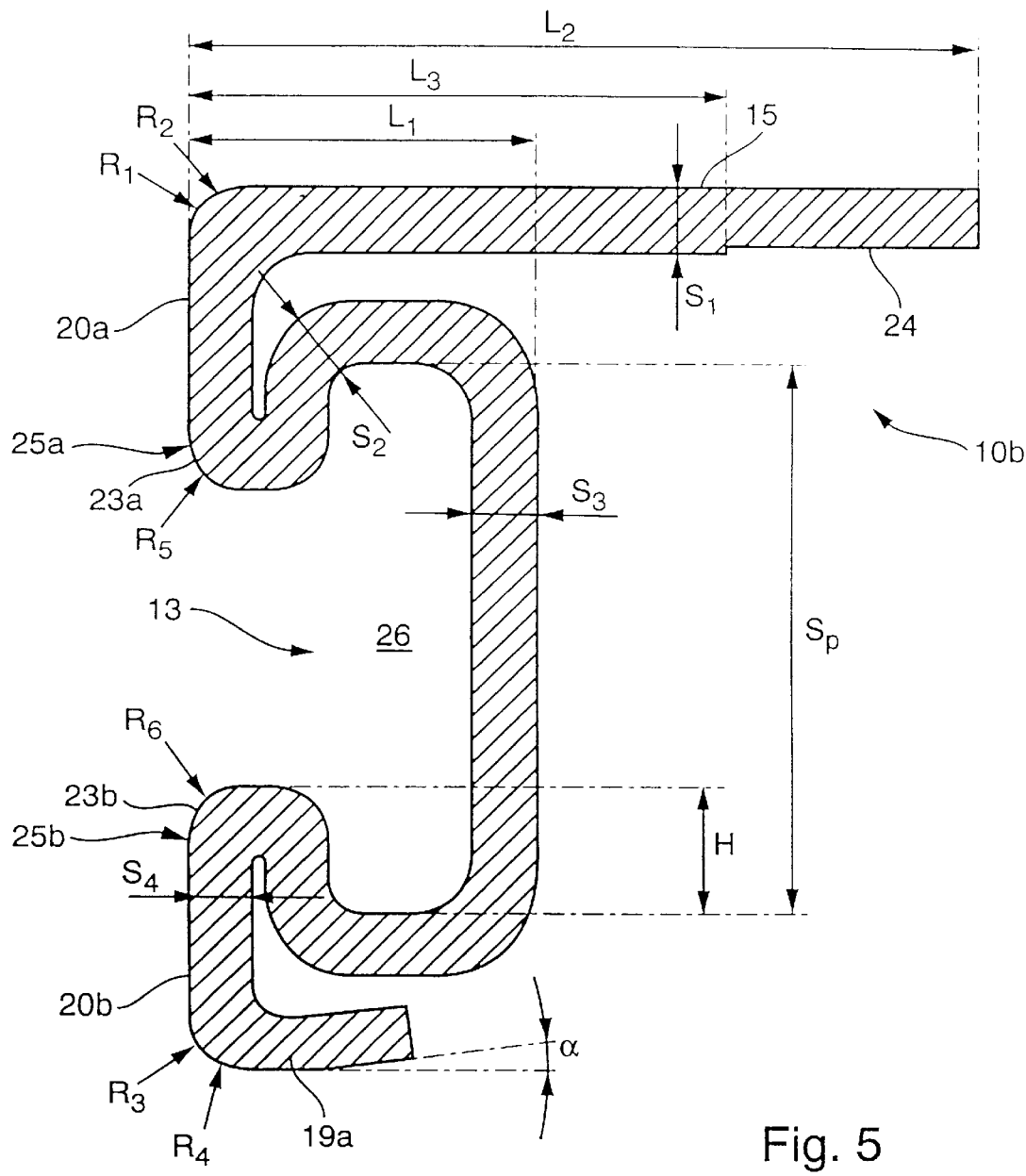
FIG. 5 shows an alternative form of seal carrier which has a doubled area in order to shorten the axial structural length.

With the further embodiment shown in FIG. 5 of the seal carrier 10b the areas agreeing with the first embodiment (FIG. 4) are provided with the same reference numerals so that reference can be made to the description of the first embodiment in order to avoid repetition. Differently from the seal carrier 10a the seal carrier 10b has a differently shaped internal profiled section 26. Each lead-in zone is adjoined by a doubled area 25a, 25b which forms a length-restricted section of the seal carrier 10*b* running parallel to the end side 20*a*, 20*b*. The doubled area 25*a*, 25*b* engenders a reduced axial length of the internal profiled section 26 which has a direct effect on the measurement $L_1$ as well as on the remaining length measurements $L_2$, $L_2$ of the seal carrier.

Figure 6:
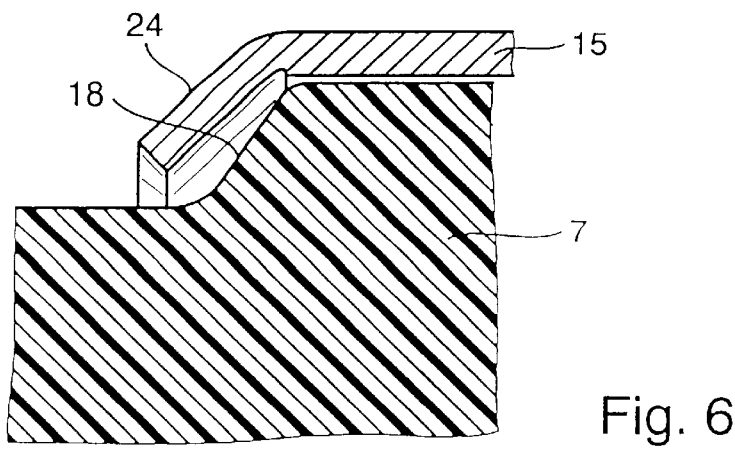
FIG. 6 shows on an enlarged scale the flanged area arranged at the end side on the outer axial projection of the seal carrier and engaging over the stepped area of the ring piston.

FIG. 6 shows on an enlarged scale the free end of the outer axial projection 15 of the seal carrier 10*a*, 10*b*. As an alternative to FIG. 1 the flanged step 24 is angled inwards not at right angles, but at an angle of about 45 degrees.

Figure 7:
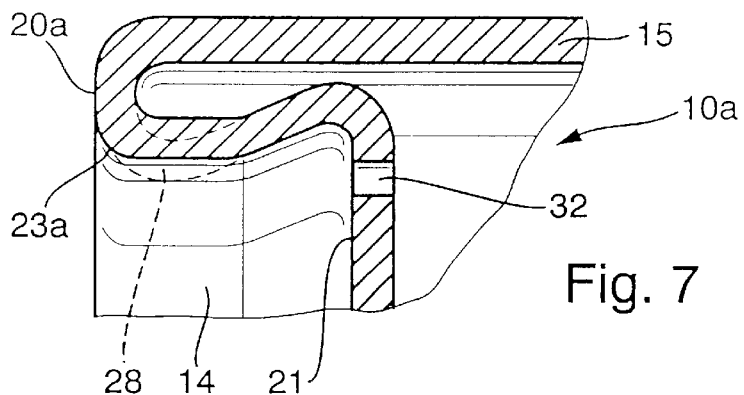
FIG. 7 shows a cut-out section of the seal carrier shown in FIG. 4 and having a ventilation groove and a ventilation bore.
Figure 8:
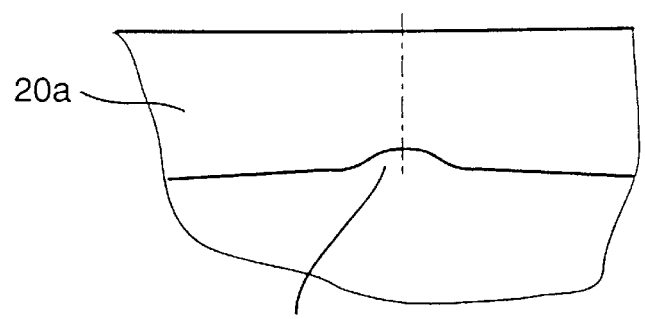
FIG. 8 is a front view of the area of the seal carrier shown in FIG. 7.

FIG. 7 shows a further feature according to the invention on the seal carrier 10*a*. The lead-in zone 23*a* is accordingly provided with a ventilation groove 29 which runs parallel to the projection 15 and through which when pressing the seal 9 into the seal carrier 10*a* the air included in the internal profiled section 14 can escape. The position and shaping of the ventilation groove 29 can be seen from FIG. 8 which is a front view of the section of the seal carrier 10*a* shown in FIG. 7. In addition or as an alternative to this the seal carrier 10*a* can be provided with a ventilation bore 32 which is formed in the planar surface 21.

Figures 9, 10:
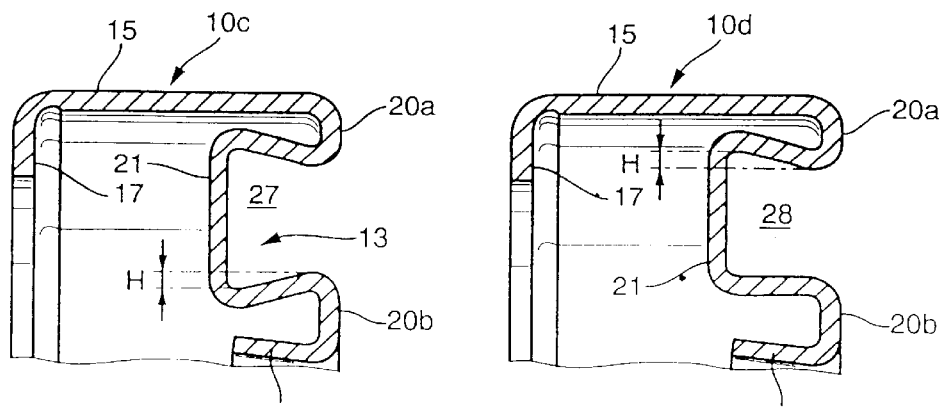
FIG. 9 is an individual itemised drawing of a seal carrier having an asymmetrically shaped inner profile provided with an undercut section directed towards the inner projection.
FIG. 10 shows an individual itemised drawing of a seal carrier whose inner profile has an undercut section directed towards the outer projection.
Figure 11:
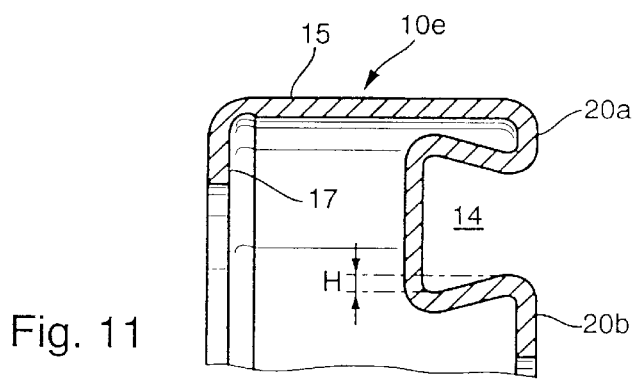
FIG. 11 shows the construction of a seal carrier with a symmetrical inner profile and the omission of the inner projection.

FIGS. 9 to 11 show further variations of the seal carrier depicted in FIG. 4. The areas of the seal carrier agreeing with FIG. 4 are provided with the same reference numerals. The following descriptions relate to different designs of the seal carrier.

FIG. 9 shows the seal carrier 10*c* whose internal profiled section 27 is shaped asymmetric. As opposed to the internal profiled section 14 according to FIG. 4 here the internal profiled section 27 has only one undercut section directed towards the inner projection 19*a*, and characterised by H.

The seal carrier 10*d* according to FIG. 10 is likewise provided with an asymmetrically shaped internal profiled section 28. The internal profiled section thereby forms an undercut section H which is directed towards the outer projection 15. Common to both inner profiled sections 27, 28 according to FIGS. 9 and 10 is an axially aligned area opposite the undercut section H.

FIG. 11 shows the seal carrier 10*e* which is shown in FIG. 3 in the installed position. This seal carrier 10*e* is provided with a symmetrically shaped internal profiled section 14, corresponding to the seal carrier 10*a* according to FIG. 4. As a difference here the seal carrier 10*e* has no inner axial projection 19*a*. Rather the internal profiled section 14 is adjoined by a radially aligned end side 20*b*.

Figure 12:
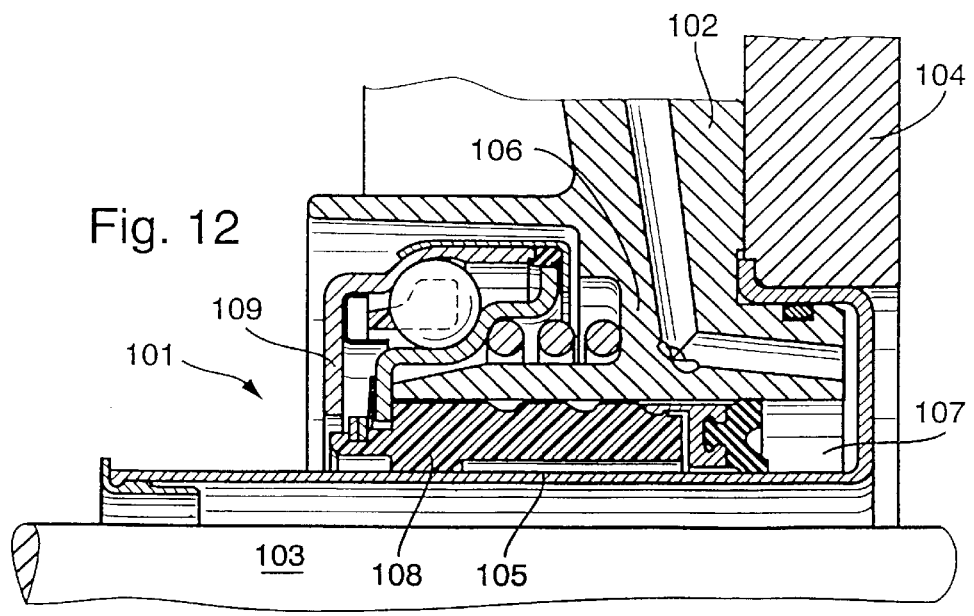
FIG. 12 shows a slave cylinder, installed in a hydraulic release system of a friction clutch of motor vehicles.

In FIG. 12 101 designates a release system which is shown in semi-section. The release system 101 comprises a pressure housing 102, which is mounted coaxial with a drive shaft 103 which connects for example an internal combustion engine to a shift transmission. The pressure housing 102 is thereby fastened on a gearbox housing 104. The pressure housing 102 has a guide sleeve 105 which is in sealing connection with a housing flange 106 and forms a pressure chamber 107 which is formed circular ring shaped. A ring piston 108 is guided in the pressure chamber 107 and is in active connection with an inclined shoulder bearing which has in turn a support face 109 through which the release mechanism (not shown) of a friction clutch (likewise not shown) can be operated.

Where shown in detail in FIGS. 13 to 23 the reference numeral 110 designates the seal which is held in a seal carrier 111. The seal carrier 111 has an inner ring 112 which is mounted inside an outer sleeve 114 through a disc-like flange 113. The inner ring 112 has a ring bead 15 through which the circular ring shaped mounting chamber 116 (see FIGS. 14 to 20 and 22) receives in its end area a reduced spacing which apart from FIG. 110 is reduced still further by an inner ring bead 117 on the outer sleeve 114 so that the seal 110 is held in positive locking engagement by its inside and outside. The outer sleeve 114 has at its end area remote from the seal 110 projections 118 which hook with keyed engagement on the ring piston 108 by undercut sections 119.

FIGS. 13 to 26 differ substantially from each other in that the disc-like flange 113 is secured and fixed in a different way in the outer sleeve 114 whereby it basically depends on which materials are used for the ring support.

Figure 13:
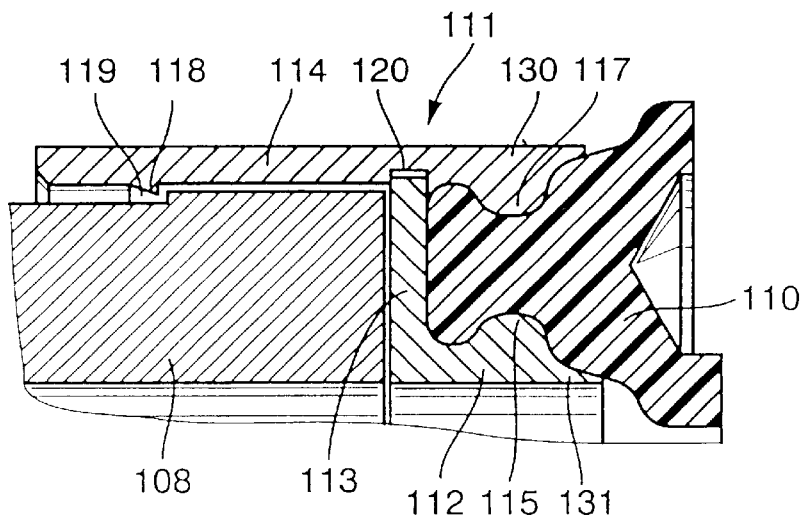
FIG. 13 shows the detail X of FIG. 12 on an enlarged scale.

According to FIG. 13 the outer sleeve 114 has on its inner circumference a fixing groove 120 in which the disc-like flange 113 snap-fits when pressed in. In order to reduce the sealing friction in the sealing lip area both the inner ring 112 and the outer sleeve are extended axially in the direction of the sealing lips of the seal 110 which thereby form a support 131 and 130 respectively.

Figure 14:
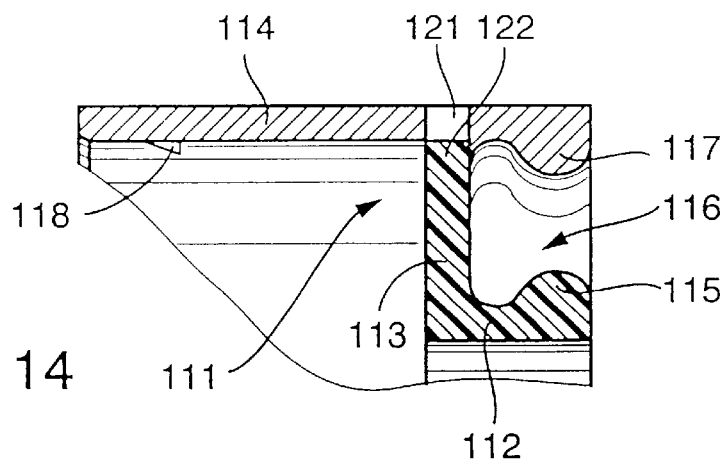
FIG. 14 shows the view according to FIG. 13 with an alternative design of the seal carrier.

According to FIG. 14 the outer sleeve 114 has windows 121 into which the projections 122 on the disc-like flange 113 snap-fit.

Figure 15:
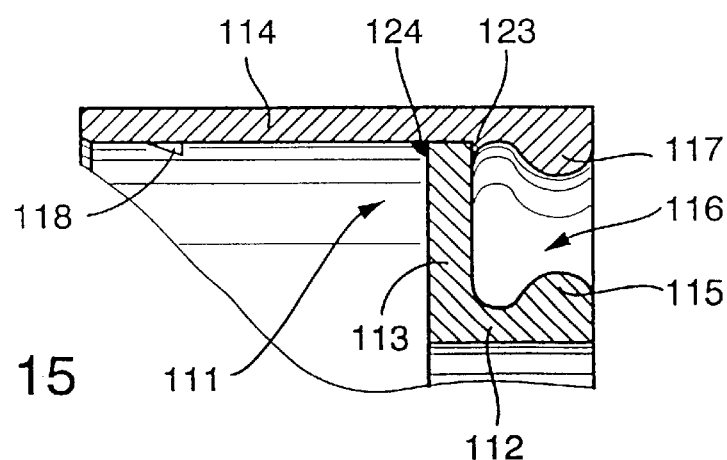
FIG. 15 shows the seal carrier according to FIG. 13 with an alternative fastening of the flange on the outer sleeve of the seal carrier.

In FIG. 15 the disc-like flange 113 is fixed on a ring-shaped stop 123 in one direction whilst it is fastened additionally in the other direction by material imprinting 124.

Figure 16:
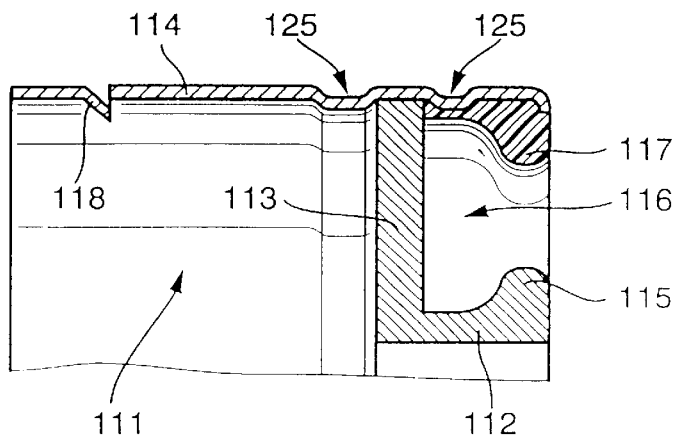
FIGS. 16 to 26 show alternative designs of the seal carrier.

In the embodiment according to FIG. 16 the outer sleeve 114 is made from a deformable material so that after fixing the disc-like flange 113 in the outer sleeve 114 the latter is finally fastened by rolling 125. The inner ring 112 and the disc-like flange 113 can be made from a different material and can be supported from inside during rolling. The inner ring bead 117 on the outer sleeve 114 can in this embodiment likewise be made from a different material e.g. from a plastics and for example applied at a later date.

Figure 17:
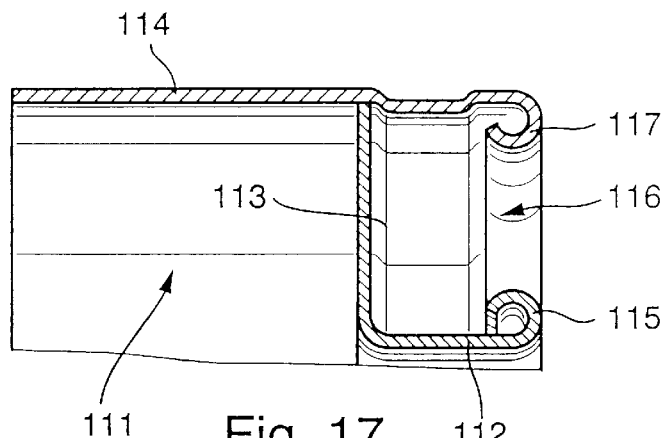

In the embodiment according to FIG. 17 the outer sleeve 114 and the inner ring 112 as well as the disc like flange 113 are made from deformable material such as for example sheet steel wherein the outer sleeve 114 has a stop which can be made for example by rolling whereby the disc-like flange is welded onto same. The ring bead 115 and the inner ring bead 117 are also made by flanging over the material.

Figures 18, 18A:
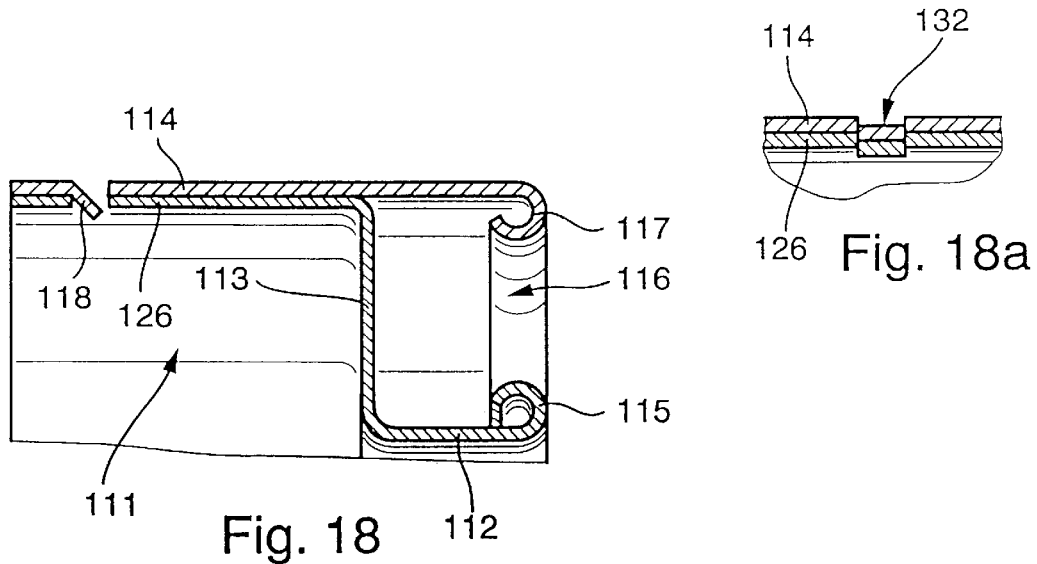

In the embodiment according to FIG. 18 the disc-like flange 113 has a circular ring shaped extension 126 which corresponds with the inner circumference of the outer sleeve 114 whereby the projections 118 on the outer sleeve 114 reach through the openings in the circular ring shaped extension 126 and at the same time fix this extension.

In FIG. 18*a* a cut-out section of the overlapped area of the inner ring 112 with the outer sleeve 114 is shown with an alternative fastening of these component parts. According to this a partial gap-free punched area 132 is provided between the outer sleeve 114 and the circular ring shaped extension 126 of the inner ring 112 to form a radially inwardly directed projection which engages by way of example in the installed state in a circumferential groove of the ring piston 108.

Figure 19:
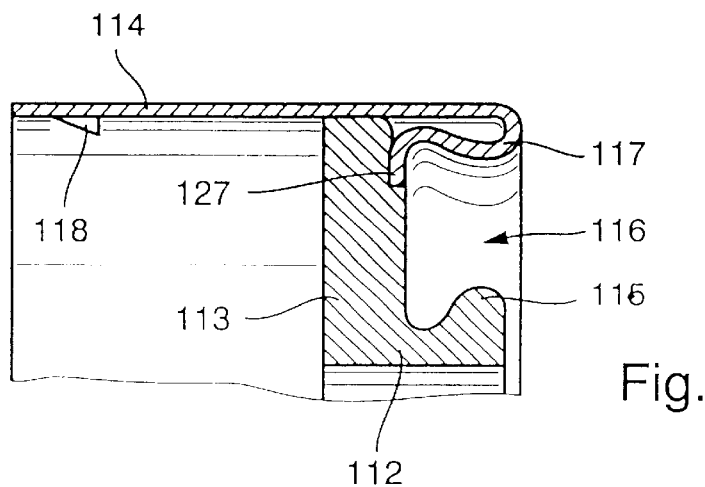

According to FIG. 19 the disc like flange 113 is fixed between a stop 127 and the end face of the ring piston 108.

Figure 20:
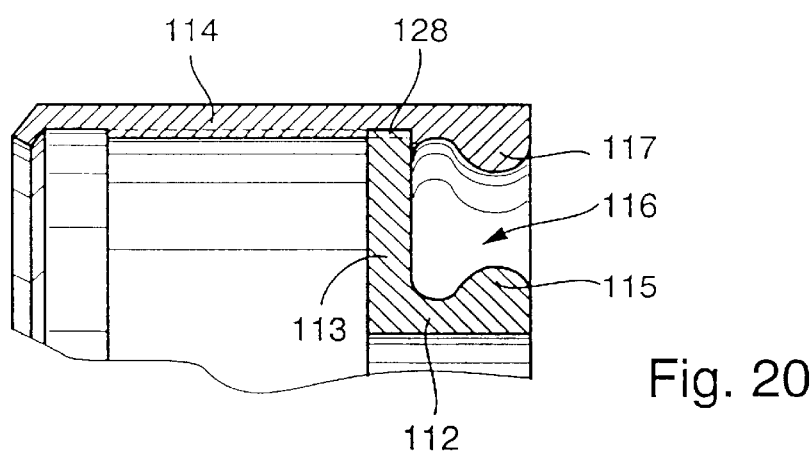

The disc like flange 114 can however also be fixed by a thread 128 on the inner circumference of the outer sleeve and on the outer circumference of the disc like flange according to FIG. 20.

Figure 21:
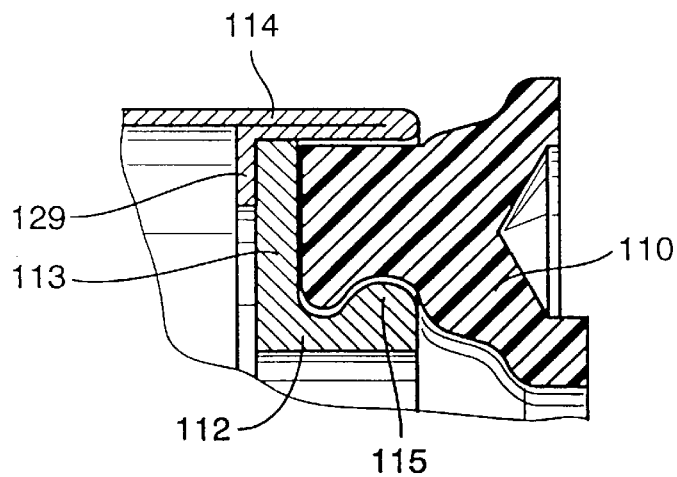

According to FIG. 21 the outer sleeve 114 has a solid flanged edge and forms an internal flange 129 on which the circular ring shaped flange is fastened, more particularly by welding or soldering.

In the embodiment according to FIG. 21 the seal is indeed supported on the outer sleeve 114 but is not engaged from behind so that the fastening is produced by the ring bead 115.

Figure 22:
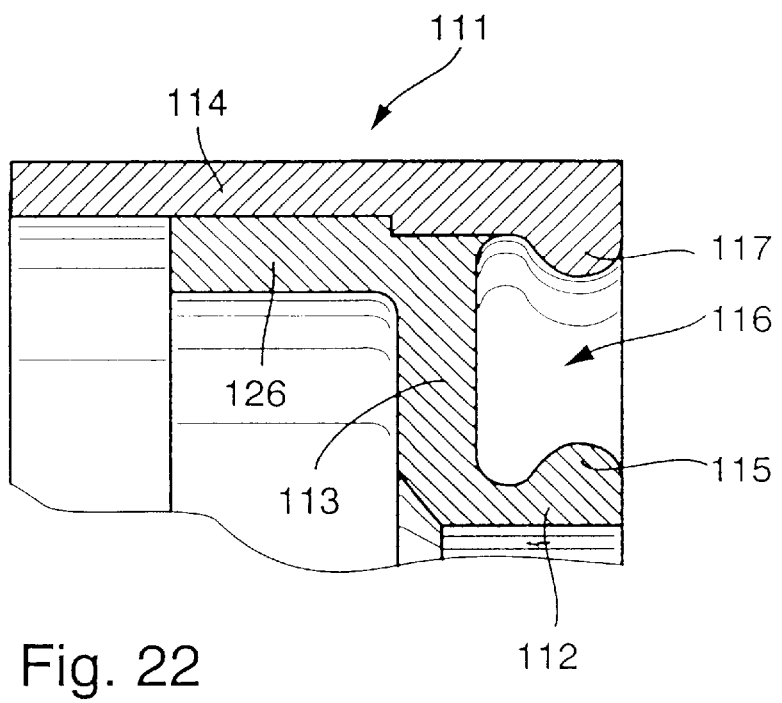

The embodiment according to FIG. 22 corresponds substantially to the embodiment according to FIG. 18 but, as can be seen from the wall thicknesses other materials are selected and the circular ring shaped extension 126 is stuck to the inner circumference of the outer sleeve 114.

Figure 23:
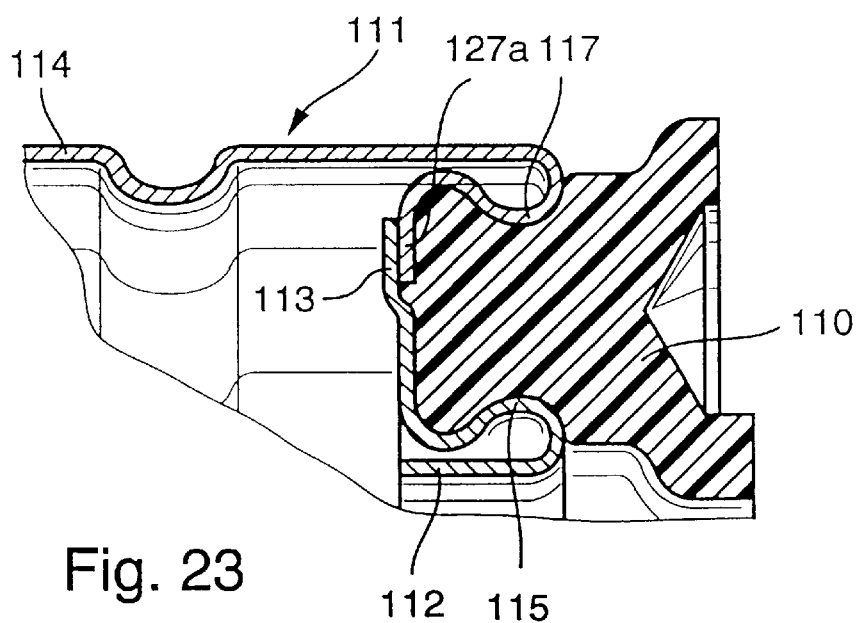
Figure 24:
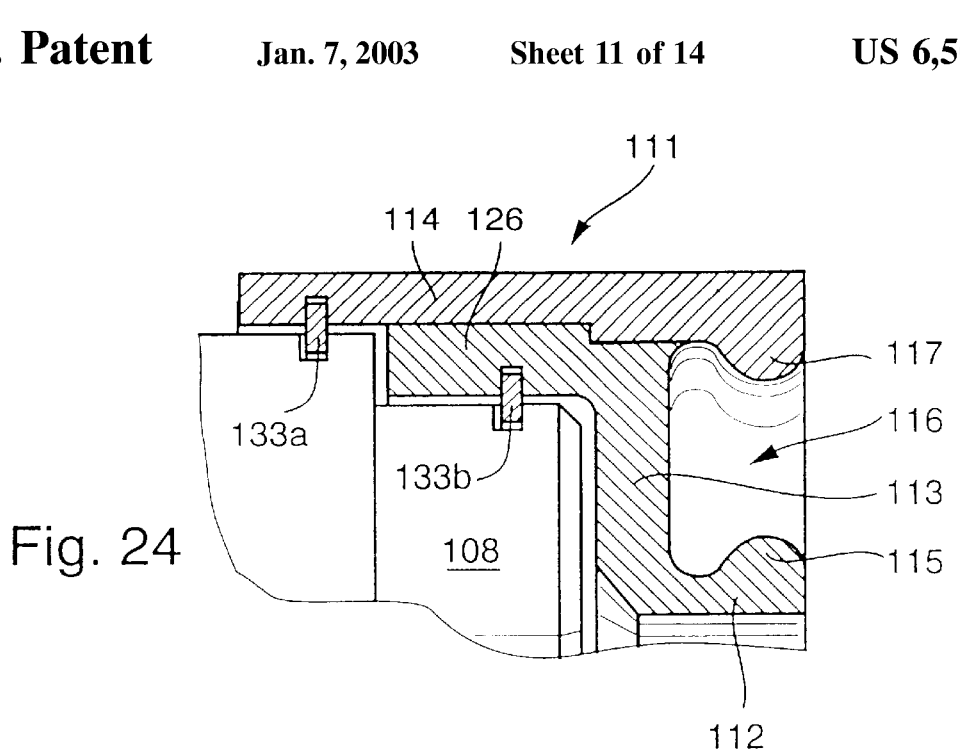
Figure 25:
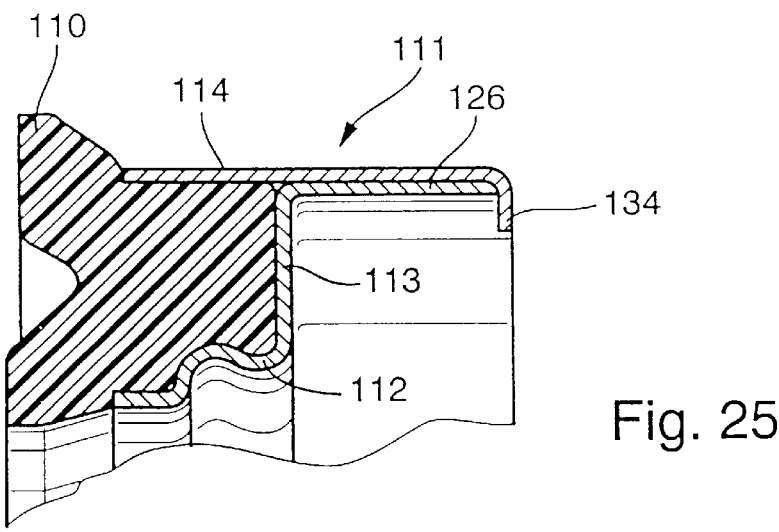
Figure 26:
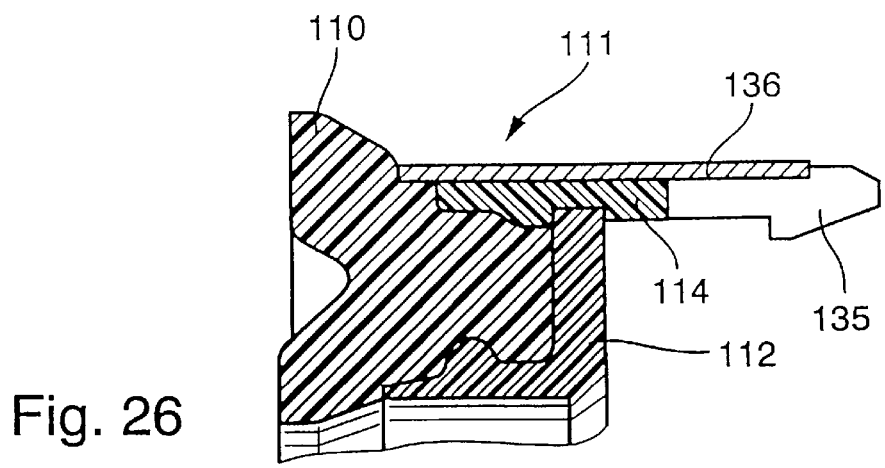

The seal carrier 111 is in the embodiment according to FIG. 23 made from a similar material and constructed similar to FIG. 17 wherein the inner ring 112 and the disc-like flange 113 as well as the outer sleeve 114 are made from a deformable sheet steel plate and the disc-like flange 113 adjoins and is welded to the stop 127*a*, which is formed similar to the stop 127 in FIG. 19. The outer sleeve 114 has in the embodiment according to FIG. 112 no projections 118 but a sunken rolled-in area which is likewise in active connection with an undercut section on the ring piston.

As a further measure of reducing the wear on the ring piston 108 when axial vibrations appear, as an alternative to a drawn or flanged edge which engages with positive locking on the ring piston 108, FIG. 14 shows groove rings 133*a*, 133*b*. One of the groove rings 133*a*, 133*b* shown in FIG. 14 is sufficient to secure the seal carrier 111 on the ring piston 108, these groove rings being guided in corresponding ring grooves of the outer sleeve 114 and the ring piston 108 and of the circular ring shaped extension 126 and ring piston 108 respectively.

The seal carrier 111 according to FIG. 15 has in order to increase the stiffness a practically gap-free adaptation of the outer sleeve 114 and the inner ring 112 to the seal 110. The outer sleeve 114 thereby extends over a wide axial area and thus encloses the seal 110 on the outside up to the shoulder of the outer sealing lip. To produce a prefitting unit it is possible to mount the seal 110 with the back of the seal first on the disc like flange 113 of the inner ring 112 before these component parts are enclosed concentrically by the outer sleeve 114. A non-detachable connection between the inner ring 112 and the outer sleeve 114 can then he produced for example by adhesive or soldering. Fixing the seal carrier 111 in position is achieved by means of a radially inwardly directed partial or circumferential edging 134 of the outer sleeve 114 which engages with positive locking for example in a circumferential groove of the ring piston 108.

In a further embodiment the seal 110 as a twin-component design is connected non-detachably direct to the inner ring 112 and the outer sleeve 114. The construction uses an inner ring 112 and outer sleeve 114 made of plastics and able to be manufactured together with the seal 110 in a two-phase injection moulding process. To secure these component parts and increase the stiffness the outer sleeve 114 is enclosed by a strip 136 preferably made of sheet metal. A snap-fit nose 135 mounted in an axial extension of the outer sleeve 114 serves to fasten the unit comprising the seal carrier 111 and seal 110 on the ring piston 108 whereby in the installed state the nose engages with positive locking in a radial recess of the ring piston 108.

Figure 27:
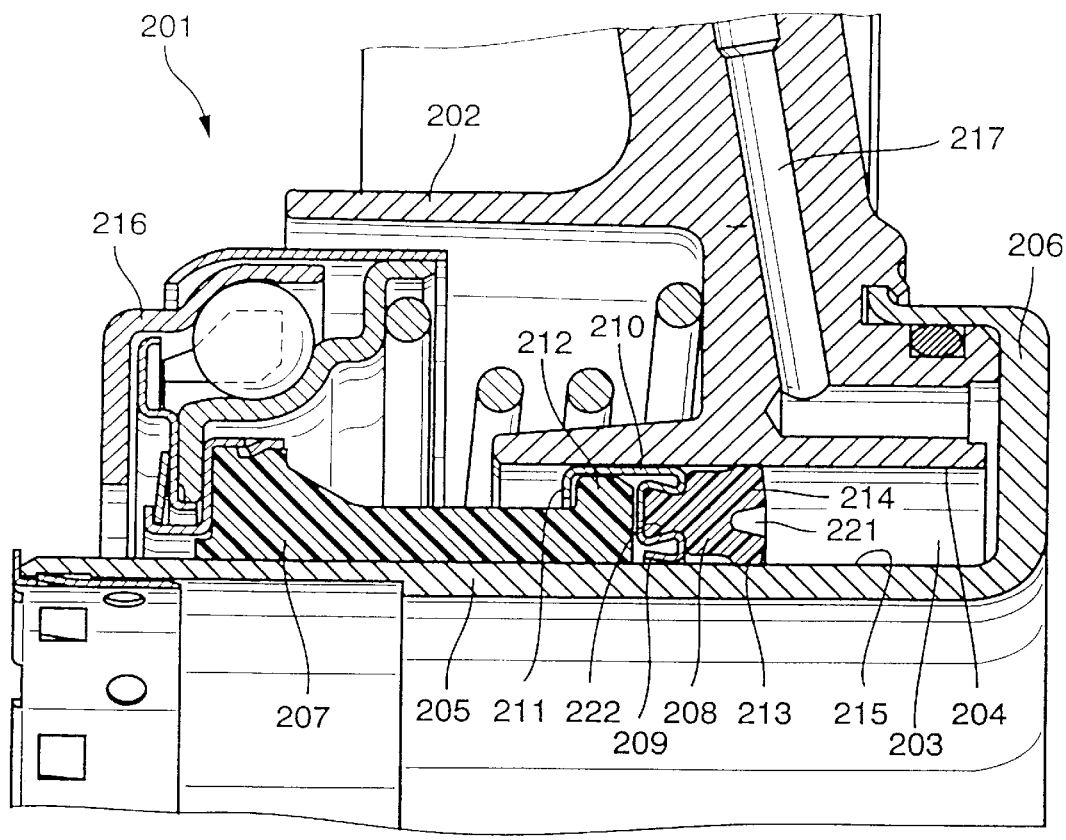
FIG. 27 is a semi-sectional view of a hydraulic release system according to the invention.

FIG. 27 shows a hydraulically operable release system 201. This comprises a cylinder 202 formed as a slave cylinder wherein this is mounted concentric about a gearbox input shaft (not shown in FIG. 27) which connects an internal combustion engine to a shift transmission. The cylinder 202 is detachably fastened on a gearbox housing (likewise not shown). The cylinder 202 has a pressure chamber 203 which is defined radially by a bore wall 204 and a guide sleeve 205. The guide sleeve 205 is fastened through an end-side ring flange 206 on the cylinder 202 and is located in the installation position radially spaced from the bore wall of the cylinder 202 and from the gearbox input shaft. The guide sleeve 205 which is made from steel plate is preferably made by a deep-drawing process without stock removal. The cylinder 202 represents a cast part for which aluminium in particular is suitable. A ring piston 207 in guided axially displaceable in the pressure chamber 203 and is associated on the pressure chamber side with a seal 208.

A seal carrier 209 in which the seal 208 is held with keyed engagement in a trapezoidal shaped mounting forming two undercut sections serves to fasten the seal 208 on the ring piston 207. With an outer axially aligned arm 210 the seal carrier 208 encloses an end area of the ring piston 207 whereby the arm is provided at the end side with an edge 211 directed radially inwards at right angles and engaging in the installed state behind a shoulder 212 of the ring piston 207. The seal 208 is further provided with a radially inner sealing lip 213 which sealingly adjoins a sleeve face 215 of the guide sleeve 205. A further radially outer sealing lip 214 is supported in sealing manner on the bore wall 204 of the cylinder 202. At the end remote from the pressure chamber 203 the ring piston 207 is provided with a release bearing 216 which in the installed state is supported with force-locking engagement on release means of a shift and separate clutch connected to the internal combustion engine. The pressure chamber 203 can be biased with hydraulic means through a supply bore 217 formed in the cylinder 202 to axially displace the ring piston 207.

Figure 28:
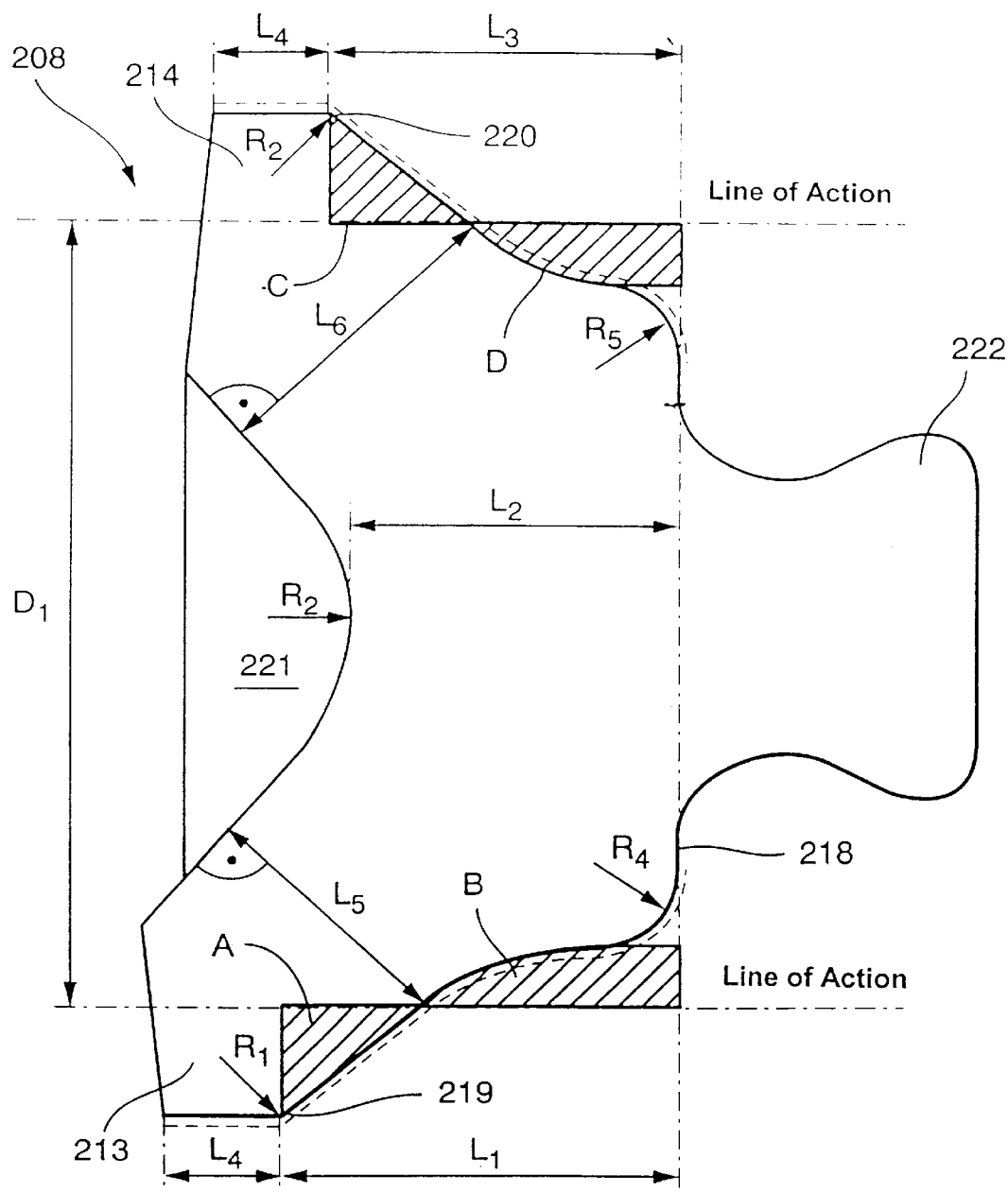
FIG. 28 is a longitudinal sectional view of the profile of the seal on an enlarged scale.

FIG. 28 shows the seal 208 according to the invention on an enlarged scale. According to this the geometric arrangement or formation of the sealing lips 213, 214 is asymmetric. The radially inner sealing lip 213 thereby has a longitudinal extension, characterised by the measurement $L_1$, starting from a back 218 of the seal up to a function point 219 on the outer contour of the sealing lip 213. A corresponding measurement $L_3$ is provided for the radially outer sealing lip 218 which is set between the back of the seal 218 and the function point 220. The function points 219, 220 determine the point or zone with which the sealing lips 213, 214 are supported with the greatest radial pretension on the sealing track of the bore wall 204 or guide sleeve 205. To produce a rounded transition at the function points 219, 220 a radius $R_1$; $R_2$ is provided each time. The installation space of the seal 208 between the cylinder 202 or the bore wall 204 respectively and the guide sleeve 205, according to FIG. 27, is indicated in FIG. 28 by the measurement $D_1$. This installation measurement allocates to each sealing lip 213, 214 in the non-installed state a so-called active line which intersects the relevant outer contour of the sealing lip 213, 214. The active line thereby forms each time an overlap zone A and an underlap zone B for the sealing lip 213 and correspondingly for the sealing lip 214 the overlap zone C and the underlap zone D. The overlap zones A;C are thereby restricted starting from the intersection point of the active line with the outer contour up to the function points 219,220. To explain the individual zones these are shaded differently for each sealing lip. The overlap zones A,C are adjoined axially by a further axially aligned area exceeding the active lines. These sections have a longitudinal extension $L_4$ which in the non-installed state of the seal (8) form a cylindrical outer contour.

The seal 208 is provided on the end side with a circumferential V-shaped ring groove 221 which forms a radius $R_3$ at the groove base. The groove depth is determined by the measurement $L_2$ which extends between the back 218 of the seal and the groove base. Furthermore the shape of the seal 208 provides that the outer contour thereof is formed for the sealing lips 213, 214 at the transition to the back 218 of the seal rounded in the form of a radius $R_4$;$R_5$. The wall thickness of the seals 213, 214 is likewise formed differently. As explained in FIG. 28 the measurement $L_6$ of the sealing lip 214 exceeds the corresponding measurement $L_5$ of the sealing lip 213.

This measurement comparison is produced each time by a right-angled arm extending from the outer contour of the ring groove 221 and guided through the intersection point of the active line with the outer contour of the relevant sealing lip. To fasten the seal 208 in the seal carrier 209 according to FIG. 27 the back 218 of the seal is adjoined by an attachment 222 with a restriction on both sides which fits with keyed engagement in the seal carrier 209. For the chemical finishing treatment of the seal 208 according to the invention it is proposed to bias the seal at least in part. For this it is suitable to treat the outer contour of the two sealing lips 213, 214 starting from the tangent point of the radii $R_4$; $R_5$ with the back 218 of the seal, up to the free end.

Figure 29:
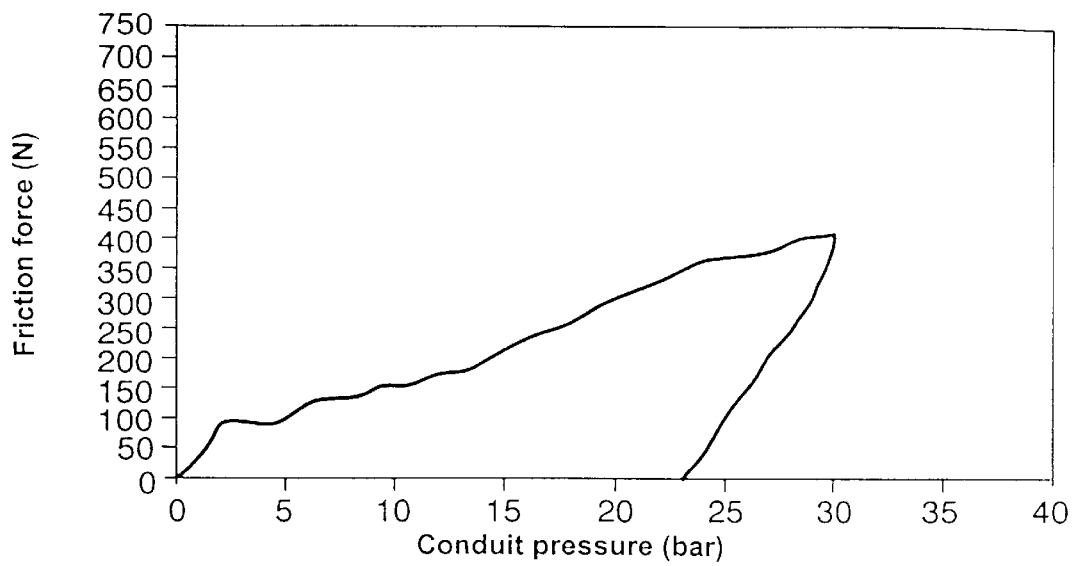
FIG. 29 is a diagram showing the pedal force curve of release systems known up until now and FIG. 30 shows the pedal force curve for a release system according to the invention.
Figure 30:
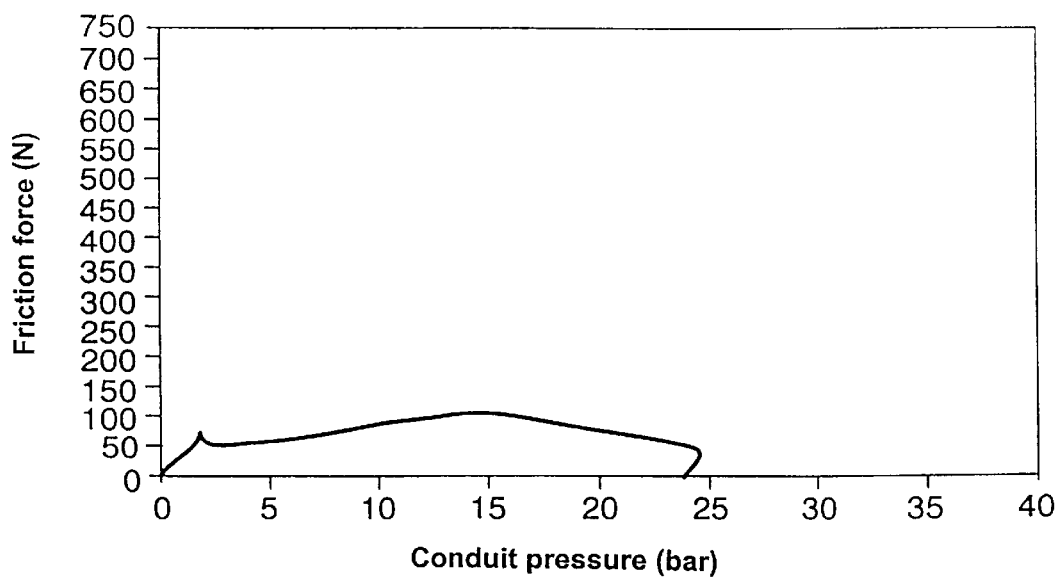

FIGS. 29 and 30 show the pedal forces required to operate the shift and separate clutch between a release system of the previous construction (FIG. 29) and a release system according to the invention.

In both diagrams the pressure, i.e. the pipeline pressure (bar) is entered on the abscissa and the friction force (N) is entered on the ordinate whereby the scales between the two diagrams are the same. FIG. 30 shows the friction force reduced to about 90 N and which according to FIG. 29 amounts to about 400 N taking into account the same operating pressures.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. Slave cylinder for a hydraulic release of a friction clutch of motor vehicles, whose pressure housing has a circular ring shaped pressure chamber in which a ring piston is displaceably guided, and for sealing, an elastic seal positively locked to the ring piston by means of a seal carrier and wherein the seal has sealing lips spread out substantially V-shaped so that in the installed position they are radially pretensioned sealingly against the circular cylindrical wall faces of the pressure chamber, characterized in that the seal carrier has a circular annular mounting chamber open towards the seal and provided with an inner ring and an outer sleeve, that the internal spacing in the end of the mounting chamber facing the seal is reduced, that the seal has at least a matching recess for keyed connection with the seal carrier and that the seal carrier is made up of two component parts which are manufactured separately from each other.

2. Slave cylinder according to claim 1 characterized in that the reduction in the internal spacing in the end area is formed by a restriction on the outer sleeve and/or an expansion of the diameter on the inner ring wherein the restriction or diameter expansion are configured in the form of ring beads.

3. Slave cylinder according to claim 1 characterised in that the inner ring has on the side remote from the seal a disc-like flange which is in active connection with the outer sleeve.

4. Slave cylinder according to claim 3 characterised in that the disc-like flange is fixed in a fixing groove on the inner circumference of the outer sleeve.

5. Slave cylinder according to claim 1 wherein the ring piston is mounted between a bore wall of the cylinder and a guide sleeve and wherein the sealing lips are subjected to at least in part to a chemical treatment to reduce the friction at a corresponding sealing track of the bore wall or guide sleeve respectively.

6. Slave cylinder according to claim 5 wherein the chemical treatment is restricted to the sealing lips of the seal and takes place in a gas or fluid phase of a halogen.

7. Slave cylinder according to claim 6 wherein the halogen is selected from the group consisting of chlorine, fluorine, bromine and iodine.

8. Slave cylinder according to claim 5 wherein the chemical treatment changes a marginal zone of the sealing lips which reaches a depth measurement of >5 μm.

9. Slave cylinder according to claim 5 wherein one of a metal material and plastics is provided as a friction partner between the seal which is made of ethylene-propylene-diene rubber (EPDM) and the sealing track.

10. Slave cylinder according to claim 5 with a surface quality of the seal track which has on the bore wall of the cylinder a bearing proportion of >15% and on a sleeve face of the guide sleeve a bearing proportion of >20%.

11. Slave cylinder according to claim 5 wherein the seal is provided with asymmetrically shaped sealing lips whose longitudinal extension and wall thickness differ from each other and thereby a length measurement $L_1$ of the inner sealing lip exceeds the corresponding length measurement $L_3$ of the outer sealing lip and its wall thickness $L_6$ exceeds the wall thickness $L_5$ of the inner sealing lip.

12. Slave cylinder according to claim 11 with a seal which a wall thickness ratio of the outer sealing lip to inner sealing lip of $L_6/L_5 \geq 1.1$.

13. Slave cylinder according to claim 11 wherein the longitudinal extension of the sealing lips is determined by a measurement between the seal back and a function point and its length ratio amounts to $L_1/L_3 \geq 1.1$.

14. Slave cylinder according to claim 11 wherein the seal has an end side V-shaped ring groove restricted radially by the sealing lips and with a distance measurement of the groove base from the seal back which is characterised by the measurement $L_2$.

15. Slave cylinder according to claim 11 wherein an outer contour of the inner sealing lip is shaped so that in the non-installed state this forms starting from the seal back up to an intersecting point with an active line which determines an installation chamber $D_1$ of the seal an underlap zone B adjoined after the intersection point by an overlap zone A which reaches up to a function point and whose surface area ratio amounts to A/B>0.5.

16. Slave cylinder according to claim 11 wherein the outer contour of the outer sealing lip starting from the intersection point with the active line up to a function point forms an overlap zone C as well as an underlap zone D which is set from the seal back up to the intersection point of the outer contour with the active line and whose surface area amounts to C/D>0.7.

17. Slave cylinder according to claim 11 wherein an outer contour of the inner sealing lip is shaped so that in the non-installed state this forms starting from the seal back up to an intersecting point with an active line which determines an installation chamber $D_1$ of the seal an underlap zone B adjoined after the intersection point by an overlap zone A which reaches up to a function point and wherein the outer contour of the outer sealing lip starting from the intersection point with the active line up to the function point forms an overlap zone C as well as the underlap zone D which is set from the seal back up to the intersection point of the outer contour with the active line and wherein the surface area ratio amounts to A/B=1 and likewise the surface area ratio C/D=1.

18. Slave cylinder according to claim 11 wherein an outer contour of the inner sealing lip is shaped so that in the non-installed state this forms starting from the seal back up to an intersecting point with an active line which determines an installation chamber $D_1$ of the seal an underlap zone B adjoined after the intersection point by an overlap zone A which reaches up to a function point and wherein the outer contour of the outer sealing lip starting from the intersection point with the active line up to the function point forms an overlap zone C as well as an underlap zone D which is set from the seal back up to the intersection point of the outer contour with the active line and wherein both the ratio of the surface areas A/B agrees with the surface area ratio C/D and also the size of the surface area A to D relative to each other.

19. Slave cylinder according to claim 11 wherein the sealing lips have an oversize $L_4$ reaching from a function point up to a free end, with an outer contour which in the non-installed state of the seal runs at an angle of ±5°.

20. Slave cylinder according to claim 19, with a seal configuration wherein the length of the radially inner sealing lip to the installation space $D_1$, also designated as the height measurement of the seal, amounts to a measurement ratio $L_1+L_4/D_1>0.6$.

21. Slave cylinder according to claim 19, wherein a length measurement $L_1+L_4$ determining the overall length of the inner sealing lip in relation to the spacing measurement $D_1$ of the active lines stands in a measurement ratio of $L_1+L_4/D_1>0.3$.

22. Slave cylinder according to claim 4 wherein the measurement $L_1$ between the back of the seal and a function point of the sealing lip exceeds the measurement $L_2$ between the back of the seal and the groove base of the ring groove.

23. Slave cylinder according to claim 14 wherein in the area of a function point the outer contour of the sealing lip forms a radius $R_1;R_2$ whose measurement is >0.1 mm.

24. Slave cylinder according to claim 23 wherein the ring groove forms a radius $R_3$ which exceeds the radius $R_1;R_2$.

25. Slave cylinder according to claim 23 with a configuration of the seal which at the transition at the back of the seal to the outer contour of the relevant sealing lip forms a radius $R_4;R_5$ whose measurement exceeds the radius $R_1;R_2$.

26. Slave cylinder according to claim 25 wherein the radii $R_4$ and $R_5$ are dimensioned differently from each other or agreeing with each other.

27. Slave cylinder according to claim 25 wherein the partial chemical treatment of the sealing lip starting from a tangent point of the radius $R_4$; $R_5$ to the back of the seal extends up to a free end of the sealing lip.

* * * * *